US008123071B2

(12) United States Patent
Fitzgerald et al.

(10) Patent No.: US 8,123,071 B2
(45) Date of Patent: Feb. 28, 2012

(54) METHODS AND APPARATUS FOR INCREASING THE SPEED OF DISPENSING ARTICLES FROM VENDING MACHINES

(75) Inventors: Robert M. Fitzgerald, Norcross, GA (US); Ward P. Broom, Snellville, GA (US); Keith Stallings, Dacula, GA (US); Kyle Joiner, Roswell, GA (US)

(73) Assignee: Innovative Product Acheivements, LLC

( * ) Notice: Subject to any disclaimer, the term of this patent is extended or adjusted under 35 U.S.C. 154(b) by 1158 days.

(21) Appl. No.: 11/864,096

(22) Filed: Sep. 28, 2007

(65) Prior Publication Data
US 2009/0084807 A1  Apr. 2, 2009

(51) Int. Cl.
B65G 59/00 (2006.01)
(52) U.S. Cl. ........ 221/129; 221/130; 221/131; 221/124; 221/125; 312/42
(58) Field of Classification Search .......... 221/124, 221/125, 129–131; 312/42
See application file for complete search history.

(56) References Cited

U.S. PATENT DOCUMENTS

| 2,446,807 A | 8/1948 | Blair |
| 2,766,906 A | 10/1956 | Bookout |
| 2,986,304 A | 5/1961 | Barnhart |
| 3,010,608 A | 11/1961 | Lyons |
| 3,194,432 A | 7/1965 | Breitenstein et al. |
| 3,489,315 A | 1/1970 | Craven |
| 3,941,279 A | 3/1976 | Krakauer |
| 4,411,351 A | 10/1983 | Lowder et al. |
| 4,793,665 A | 12/1988 | King |
| 4,807,779 A | 2/1989 | Clapper |
| 4,967,928 A | 11/1990 | Carter |
| 5,069,511 A | 12/1991 | Swets et al. |
| 5,249,392 A | 10/1993 | Houston et al. |
| 5,385,265 A | 1/1995 | Schlamp |
| 5,431,299 A | 7/1995 | Brewer et al. |
| 5,638,985 A * | 6/1997 | Fitzgerald et al. ............ 221/125 |
| 5,713,270 A | 2/1998 | Fitzgerald et al. |

(Continued)

FOREIGN PATENT DOCUMENTS
EP  1271432  1/2003
(Continued)

OTHER PUBLICATIONS

Partial International Search Report dated Apr. 14, 2009, regarding Application No. 08253169.0—2221/2045784.

(Continued)

Primary Examiner — Michael K Collins
(74) Attorney, Agent, or Firm — Alston + Bird LLP

(57) ABSTRACT

Improvements to increase the speed at which a vending machine can dispense articles are disclosed. In various embodiments, the machine defines plural first arrays of receptacles for receiving articles with the first arrays stacked so that adjacent receptacles in the first arrays form second arrays. A separate user door closes each first array of receptacles, a slot door assembly provides a plurality of receptacle doors operative to open a particular receptacle when the user door is unlocked, and a slot access mechanism provides access to a particular receptacle. The machine waits a specified time period after dispensing to detect whether a subsequent user request is received. If a subsequent user request is received, the machine moves the slot access mechanism directly to a receptacle where the articles are available. Additional improvements include procedures for avoiding problems caused by misaligned doors and procedures for providing optimal article stocking.

21 Claims, 15 Drawing Sheets

U.S. PATENT DOCUMENTS

| | | | | |
|---|---|---|---|---|
| 5,836,662 | A | * | 11/1998 | Robey ............................ 312/268 |
| 5,905,653 | A | | 5/1999 | Higham et al. |
| 5,924,780 | A | | 7/1999 | Ammon et al. |
| 5,979,952 | A | | 11/1999 | Dering et al. |
| 5,993,046 | A | | 11/1999 | McGrady et al. |
| 6,223,934 | B1 | | 5/2001 | Shoenfeld |
| 6,330,856 | B1 | | 12/2001 | Fitzgerald et al. |
| 6,450,598 | B1 | | 9/2002 | Hanel |
| 6,502,718 | B2 | | 1/2003 | Fitzgerald et al. |
| 6,640,159 | B2 | | 10/2003 | Holmes et al. |
| 6,848,491 | B2 | | 2/2005 | Gambarelli et al. |
| 6,994,409 | B2 | | 2/2006 | Godlewski |
| 7,063,022 | B1 | | 6/2006 | Marchiori et al. |
| 7,134,242 | B2 | | 11/2006 | Fitzgerald |
| 7,234,609 | B2 | | 6/2007 | DeLazzer et al. |
| 2002/0130135 | A1 | | 9/2002 | Fitzgerald et al. |
| 2004/0245272 | A1 | | 12/2004 | Fitzgerald et al. |
| 2005/0000974 | A1 | | 1/2005 | Chirnomas |
| 2008/0228317 | A1 | * | 9/2008 | Ervin ............................ 700/231 |

FOREIGN PATENT DOCUMENTS

| | | |
|---|---|---|
| JP | 2004 355196 | 12/2004 |

OTHER PUBLICATIONS

International Search Report dated Dec. 5, 2008, International Patent Application PCT/US08/11195, filed Sep. 25, 2008.

* cited by examiner

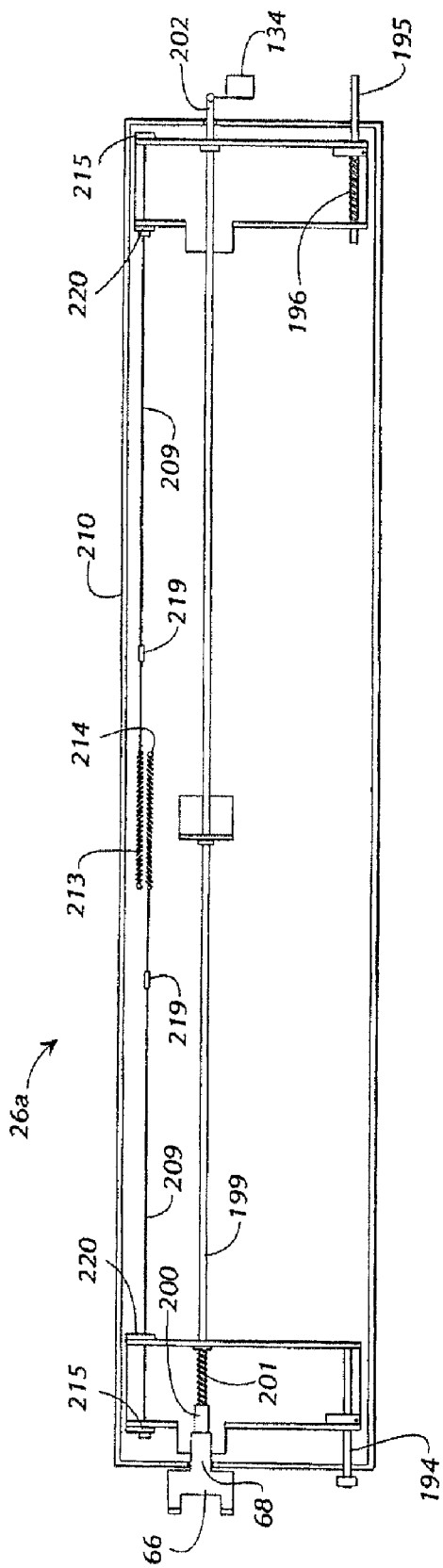
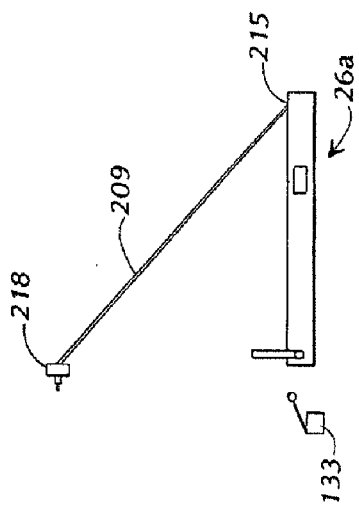
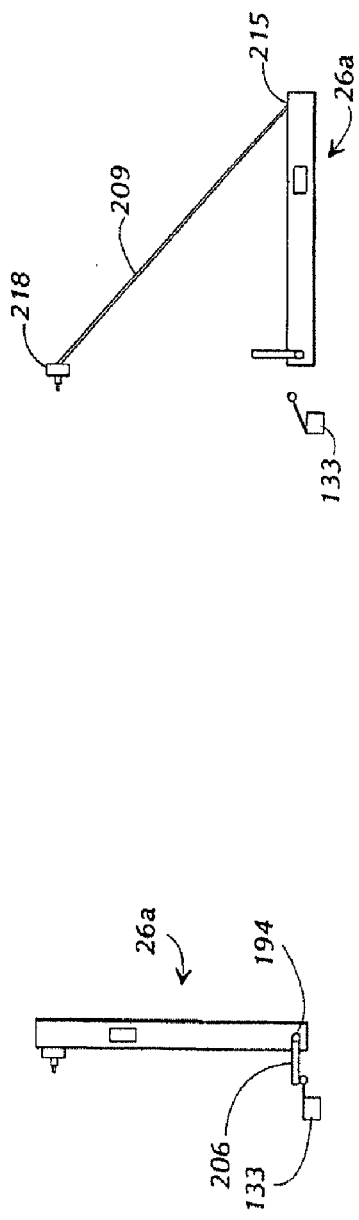
*FIG. 4A*
*FIG. 4B*
*FIG. 4C*

METHODS AND APPARATUS FOR INCREASING THE SPEED OF DISPENSING ARTICLES FROM VENDING MACHINES

BACKGROUND OF THE INVENTION

1. Field of the Invention

This invention generally relates to increasing the speed of dispensing articles from machines for vending or dispensing discrete articles, and more particularly relates to methods and apparatus for increasing the speed of dispensing articles from machines for vending or dispensing articles such as scrub garments and the like.

2. Description of the Related Art

Scrub garments are uniforms typically worn by doctors, nurses, and other medical workers in hospital operating rooms or other locations where the workers are likely to be in immediate proximity with patients. These scrub garments are hereafter called "scrubs". Scrubs provide an easily-changed launderable barrier between the wearer and the patient, helping to prevent the patient from exposure to germs or infectants on the wearer's body or street clothing.

Hospitals normally make scrubs available to doctors and other medical workers at no direct cost to those users. Although each user is supposed to have only a limited number of scrubs at any given time for his or her personal use, some users will hoard scrubs of their size to maintain their own personal reserve. Other users may appropriate extra sets of scrubs for their own personal use, at home or elsewhere outside the hospital. These and other improper uses of scrubs contribute to an unacceptable shrinkage in the inventory of scrubs maintained by the institution for use by authorized persons.

An approach to overcome the foregoing problem is to dispense scrubs from a vending machine or apparatus. One such vending apparatus is found in application Ser. No. 08/371,363 entitled "Vending Apparatus and Method," filed on Jan. 11, 1995, now U.S. Pat. No. 5,638,985, which is hereby incorporated herein by reference in its entirety. An embodiment of the vending apparatus disclosed in U.S. Pat. No. 5,638,985 provides of a number of receptacles or slots from which one or more articles are dispensed. The receptacles are preferably disposed in a matrix of one or more generally linear arrays of receptacles. The apparatus further provides an interior receptacle door assembly made up of a plurality of moveable receptacle doors positionable to allow access to a selected column of receptacles while blocking access to the remaining columns of receptacles. In addition, the apparatus provides exterior user doors that cover the receptacle door assembly and all the receptacles in a row of receptacles, thus preventing access to the receptacle door assembly and to the receptacles. In order to dispense the scrubs from a particular receptacle, the vending apparatus first operates the receptacle door assembly to allow access the particular column of receptacles or column. Then, the vending apparatus unlocks a particular user door associated with a row of receptacles to provide access to the particular receptacle in the exposed column. Then, a user seeking to obtain the scrubs may open the user door and remove the scrubs from the particular receptacle through the receptacle doors. Because the receptacle door assembly prevents access to all other receptacles in the row, the user cannot remove the scrubs from any receptacle other than the one initially selected in the vending operation.

Once the vending operation is complete, it is preferable in this embodiment of the apparatus for the mechanism used to position the receptacle door to return to a home location in order to re-close the previously-opened receptacle and put all the receptacle doors in a known position for the next dispensing operation. However, there is a disadvantage to following this practice. For example, a typical vending operation requires only about six seconds for completing the dispensing of the scrubs to a user. However, a user request for dispensing scrubs immediately followed by a subsequent user request for dispensing scrubs can be time consuming if the mechanism used to position the receptacle doors is required to return to the home location to reset the doors after the first user request is complete and before engaging in the subsequent user request. This full reset operation can add as much as twelve to fifteen seconds to the total dispensing operation. As a result, a waiting line may form when a number of users want to obtain articles from the dispenser at the same time, for example, a number of hospital employees trying to obtain their scrubs during a shift change at a hospital.

Thus, a need exists to try and minimize the time delay experienced between two dispensing operations that immediately follow one another in a vending apparatus of the type discussed above. Such improvements will help to dispense articles, such as scrubs, to users in a more timely fashion and, in particular, help hospital staff to more quickly obtain their work scrubs and report to duty for their shift.

BRIEF SUMMARY OF THE INVENTION

The present invention addresses the need in the art to minimize the time delay experienced between two dispensing operations that immediately follow one another using a vending apparatus generally of the type described herein. Stated in general terms, a vending apparatus according to various embodiments of the present invention has an array of receptacles, wherein each receptacle is operative for receiving one or more articles to be dispensed and a user door normally preventing access to a receptacle door assembly to a user. Furthermore, the receptacle door assembly comprises a plurality of moveable receptacle doors operative to provide access to a select one of the receptacles when the user door is open. In addition, the vending apparatus has a lock mechanism responsive to operation of the receptacle door assembly to enable access through the user door to the receptacle door assembly only after the receptacle doors are positioned to select a particular receptacle and a slot access mechanism associated with the receptacle door assembly and selectively operative in response to a user request to position the receptacle doors so a selected receptacle in the array of receptacles where one or more articles associated with the user request are available to dispense remains unblocked by the receptacle doors.

Furthermore, the apparatus is operative to wait a specified time period after the user request is complete in order to detect whether a subsequent user request occurs within the specified time period. In response to detecting a subsequent user request, the apparatus directs the slot access mechanism to position the receptacle doors so that a receptacle where one or more articles associated with the subsequent user request are available to dispense is unblocked by the receptacle doors. In response to not detecting the subsequent user request, that apparatus is further operative to perform a full-reset.

In various embodiments, the apparatus performs the full-reset by directing the slot access mechanism to return to a home location in order to reset the receptacle doors. In various embodiments, the receptacle associated with the subsequent user request is the nearest receptacle where the one or more articles associated with the subsequent user request are available to dispense to the receptacle from the previous user request. In addition, the apparatus in various embodiments, in response to detecting a subsequent user request within the specified time period, is operative to direct the slot access mechanism to skip at least one adjacent receptacle to the receptacle from the previous user request and position the receptacle doors so that a receptacle where the one or more articles associated with the subsequent user request are available to dispense is unblocked by the receptacle doors.

In various embodiments, the plurality of moveable receptacle doors are supported for displacement along a path parallel to the array and number one less than the number of receptacles in the array. The receptacle doors are displaceable on the path to allow access to any selected receptacle while blocking access to the remaining receptacles.

Furthermore, in various embodiments, the slot access mechanism comprises a carriage selectively moveable adjacent the receptacle doors to a plurality of locations corresponding to the receptacles and an arm assembly moveable with the carriage in a retracted position retracted from the receptacle doors. The receptacle door, at a predetermined receptacle location corresponding to a home location, is biased to a certain location so that the location of that receptacle door is known when the arm assembly is retracted. In addition, the arm assembly is operative to selectively extend at any such location to engage the receptacle doors blocking the receptacle and separate the engaged receptacle doors, thereby unblocking access to the corresponding receptacle in response to a user request and the carriage is operative to wait a specified time period without returning to the home location after the user request is complete in order to detect whether a subsequent user request occurs within a specified time period. If the carriage detects a subsequent user request within the specified time period, the carriage is further operative to move to a location corresponding to a receptacle where one or more articles associated with the subsequent user request are available to dispense so that the arm assembly can selectively extend to engage the receptacle doors blocking the receptacle and separate the engaged receptacle doors, thereby unblocking access to the receptacle. If the carriage does not detect a subsequent request within the specified time period, the carriage returns to the home location.

In various embodiments, the apparatus is operative to direct the carriage to skip at least one adjacent receptacle to the receptacle from the previous user request and move to a location corresponding to a receptacle where the one or more articles associated with the subsequent user request are available to dispense so that the arm assembly can selectively extend to engage the receptacle doors blocking the receptacle and separate the engaged receptacle doors, thereby unblocking access to the receptacle. Furthermore, if the one or more articles associated with the subsequent user request are only available in an adjacent receptacle to the receptacle from the previous user request, the apparatus is operative to direct the carriage to move to a receptacle other than the adjacent receptacle or the home location so that the arm assembly can selectively extend to engage the receptacle doors blocking the other receptacle so as to reset the receptacle doors corresponding to the adjacent receptacle where the one or more articles associated with the subsequent user request are available.

In addition, various embodiments of the invention disclose a method for dispensing articles. The method comprising the steps of: (a) providing an array of receptacles, wherein each receptacle is operative for receiving one or more articles to be dispensed; (b) providing a user door normally preventing access to a receptacle door assembly to a user; (c) providing the receptacle door assembly comprising a plurality of moveable receptacle doors operative to provide access to a select one of the receptacles when the user door is open; (d) positioning the receptacle doors in response to a user request so that a receptacle in the array of receptacle where one or more articles associated with the user request are available to dispense remains unblocked by the receptacle doors; (e) unlocking the user door to provide access to the receptacle where the one or more articles associated with the user request are available to dispense; and (f) waiting a specified time period after the user request is complete in order to detect whether a subsequent user request occurs within the specified time period. In response to detecting the subsequent user request within the specified time period, the method further performs the step of positioning the receptacle doors so that a receptacle where one or more articles associated with the subsequent user request are available to dispense is unblocked by the receptacle doors. In response to not detecting the subsequent user request within the specified time period, the method further performs the step of performing a full-reset.

In various embodiments, the method discussed above performs the steps of: (1) skipping at least one adjacent receptacle to the receptacle from the previous user request; and (2) positioning the receptacle doors so that a receptacle where the one or more articles associated with the subsequent user request are available to dispense is unblocked by the receptacle doors, in response to detecting the subsequent user request within the specified time period.

Furthermore, various embodiments of the present invention disclose an apparatus for dispensing articles comprising an array of receptacles; each receptacle is operative for receiving one or more articles to be dispensed. In addition, the apparatus further comprises a user door normally preventing access to a receptacle door assembly to a user. The receptacle door assembly comprises a plurality of moveable receptacle doors operative to provide access to a select one of the receptacles when the user door is open. Furthermore, the apparatus comprises a lock mechanism responsive to operation of the receptacle door assembly to enable access through the user door to the receptacle door assembly only after the receptacle doors are positioned to select a particular receptacle and a slot access mechanism associated with the receptacle door assembly and selectively operative to position the receptacle doors so that any selected receptacle in the array of receptacles remains unblocked by the receptacle doors. In addition, the apparatus comprises a detection mechanism associated with the slot access mechanism and operative to detect a position of each receptacle door at the selected receptacle and whether the receptacle doors at the selected receptacle are aligned properly for operation of the receptacle doors so that the selected receptacle in the array of receptacles is unblocked by the receptacle doors.

In various embodiments, if the detection mechanism detects the receptacle doors at the selected receptacle are not properly aligned, the detection mechanism is further operative to instruct the slot access mechanism to return to a home location in order to reset the receptacle doors. In other embodiments, if the detection mechanism detects that receptacle doors at the selected receptacle are not properly aligned, the detection mechanism is further operative to instruct the slot access mechanism to position the receptacle doors at a second receptacle door in order to reset the receptacle doors at the selected receptacle.

The detection mechanism may comprise different devices in various embodiments. For example in one embodiment, the receptacle doors further comprise a metal ferro-magnetic tag and the detection mechanism comprises a magnetic sensor operative to measure the position of the tag in order to detect whether the receptacle doors are properly aligned. In another embodiment, the detection mechanism comprises an image capture device operative to obtain an image of the receptacle doors and to process the image to detect whether the receptacle doors are properly aligned.

In addition, various embodiments of the present invention disclose a method for dispensing articles. The method comprising the steps of: (a) providing an array of receptacles, each receptacle is operative for receiving one or more articles to be dispensed; (b) providing a user door normally preventing access to a receptacle door assembly to a user; (c) providing the receptacle door assembly comprising a plurality of movable receptacle doors operative to provide access to a select one of the receptacles when the user door is open; (d) detecting a position of each receptacle door at the selected receptacle and whether the receptacle doors at the selected receptacle are aligned properly for operation of the receptacle doors so that the selected receptacle is unblocked by the receptacle doors; (e) in response to detecting the position of each receptacle door at the selected receptacle is aligned properly, positioning the receptacle doors so that the selected receptacle in the array of receptacles remains unblocked by the receptacle doors; and (f) unlocking the user door to provide access to the selected receptacle.

In various embodiments, in response to detecting the position of at least one of the receptacle doors at the selected receptacle is not aligned properly, the method described above further comprises the step of returning to a home position in order to reset the receptacle doors. In other embodiments, in response to detecting the position of at least one of the receptacle doors at the selected receptacle is not aligned properly, the method described above further comprises the step of positioning the receptacle doors at a second receptacle door in order to reset the receptacle doors at the selected receptacle.

Furthermore, various embodiments of the present invention disclose a method for dispensing a plurality of articles requested by a user from a dispensing apparatus. The method comprising the steps of: (a) providing a matrix of receptacles for receiving one or more articles to be dispensed, wherein the matrix comprises a plurality of first arrays wherein each first array comprises a plurality of receptacles and the plurality of first arrays are mutually parallel to each other along a dimension perpendicular to each first array so that receptacles of each first array are juxtaposed with receptacles of an adjacent first array, and a plurality of second arrays wherein each second array comprises a selected juxtaposed receptacle in each first array; (b) providing a plurality of user doors each operative to prevent access to a receptacle door assembly to a user; (c) providing the receptacle door assembly that comprises a plurality of moveable receptacle doors operative to provide access to a particular second array of the plurality of second arrays; (d) searching each second array of the plurality of second arrays to determine whether one or more second arrays have receptacles where any one or more articles of the plurality of articles requested by the user are available to be dispensed; (e) positioning the receptacle doors of the receptacle door so that one of the second arrays identified in Step (d) is unblocked by the receptacle doors; and (f) unlocking the user doors to provide access only to the receptacles associated with the second array unblocked in Step (e) and where the any one or more articles of the plurality of articles requested by the user are available to be dispensed so that the one or more articles can be dispensed.

In various embodiments, the method described above further comprises the steps of: (g) determining groups of one or more articles likely to be requested by a user in a single visit; and (h) loading the one or more articles of each group into a single second array for the group. In various embodiments, step (g) comprises the sub-step of maintaining a log of articles dispensed in single visits in order to determine the groups of one or more articles likely to be requested by a user in a single visit. In other embodiments, step (g) comprises the sub-step of conducting a survey of users in order to determine the groups of one or more articles likely to be requested by a user in a single visit.

Lastly, in various embodiments, the above described method further comprises the steps of: (g) positioning the receptacle doors of the receptacle door so that a next second array identified in Step (d) is unblocked by the receptacle doors; and (h) unlocking the user doors to provide access only to the receptacles associated with the next second array and where the one or more articles of the plurality of articles requested by the user are available to be dispensed so that the one or more articles can be dispensed.

BRIEF DESCRIPTION OF THE SEVERAL VIEWS OF THE DRAWING(S)

FIG. 4A is an elevation view showing the back side of the user door shown in FIG. 1 according to an embodiment of the present invention.

FIG. 4B is an end view taken from the left side of FIG. 4A, with the user door closed.

FIG. 4C is an end view as in FIG. 4B, with the user door open.

DETAILED DESCRIPTION OF PREFERRED EMBODIMENT

The present invention now will be described more fully hereinafter with reference to the accompanying figures, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
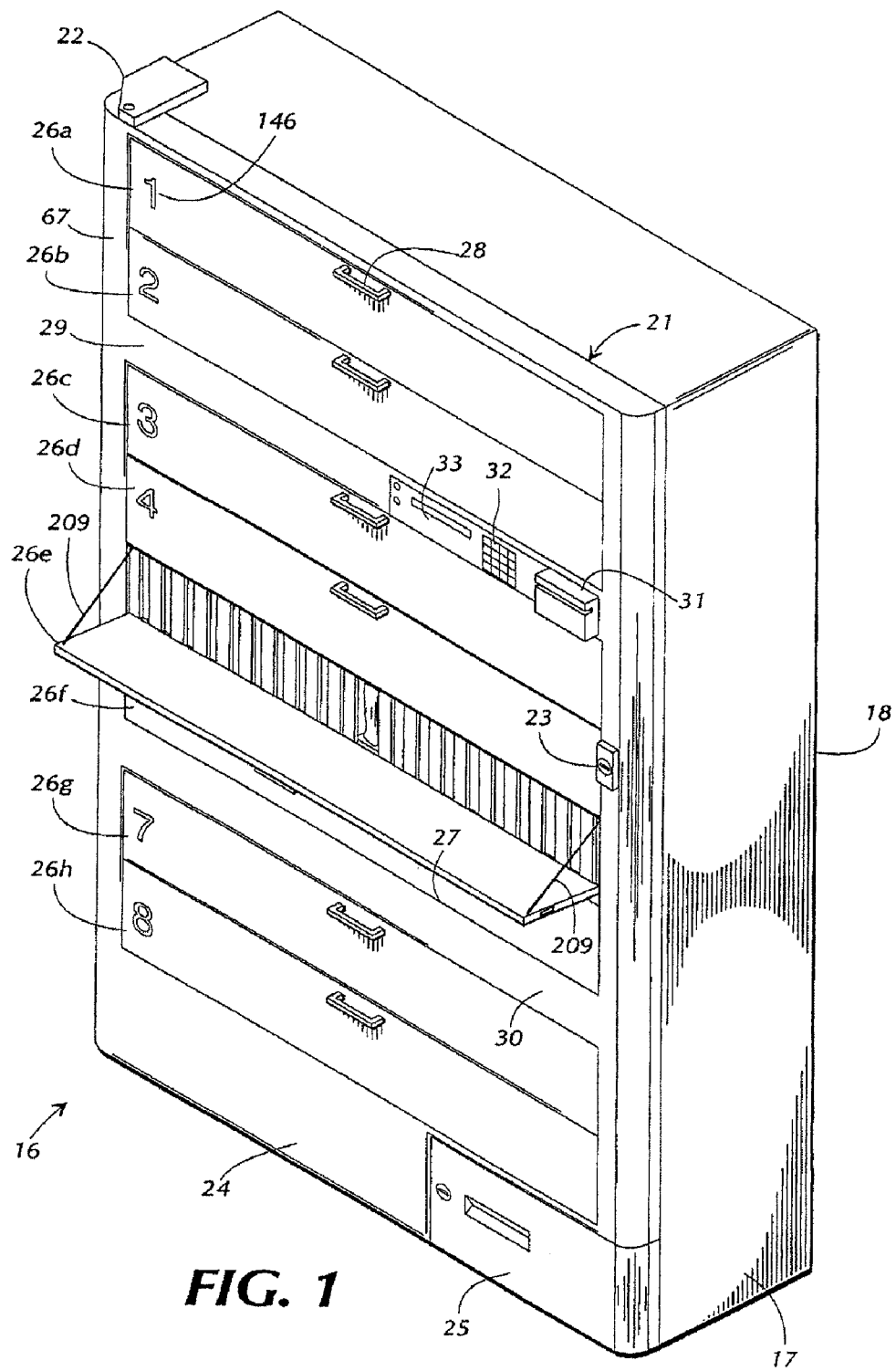
FIG. 1 is a pictorial view of a vending machine according to an embodiment of the present invention.

Turning first to FIG. 1, there is shown generally at 16 a vending machine according to an exemplary embodiment of the present invention. This vending machine 16 was designed with the intent of vending scrubs and the machine is described herein in that context. However, it should become apparent to those skilled in the art that the vending machine described herein is readily useful or adaptable for vending other kinds of articles.

In this particular embodiment, the vending machine 16 has an upright housing 17 intended to rest on a floor, and having a back side 18 that preferably fits flush against a wall or other surface (not shown) against which the vending machine is placed when in use. The open front side of the housing 17 is closed by a door assembly 21 hinged as at 22 to one side of the housing. A suitable lock 23 secures the door assembly 21 in closed position relative to the housing 17, allowing only authorized persons to access the interior of the vending machine.

The front of the door assembly 21 contains a number of user doors 26a . . . 26h. Each user door is rectangular, with its long dimension extending horizontally across the width of the door assembly 21. The individual user doors 26a . . . 26h are hinged along their lower edges 27 to the door assembly 21, so that each user door is selectively openable by pivoting that user door outwardly and downwardly from the vertical plane of the door assembly 21, as illustrated by the open user door 26e. Each user door 26a . . . 26h has a handle 28 centrally positioned along the length of the door and located near the upper edge of the door, so that a user can easily open a particular user door when that door is unlocked. Details of the locking mechanism for each user door are set forth below.

In various embodiments, the several user doors 26a . . . 26h are substantially contiguous to each other in a vertical array, with two exceptions as depicted in FIG. 1. The doors 26b and 26c are vertically separated by a horizontal panel 29 formed by a front portion of the door assembly 21. Similarly, the user doors 26f and 26g are separated by another horizontal panel 30. The vertical separation represented by each panel 29 and 30 is used to accommodate the slot actuating mechanisms contained within the housing 17, as described below. Mounted in the upper panel 29 is the user operating controls. In various embodiments the operating controls may include a magnetic card reader 31, a keypad 32 for manual data entry, and a user display 33 containing a digital readout to display selected messages to users. In other embodiments, other operating controls may be used such as a touch screen. The card reader 31 is preferably of the kind having a slot through which a user can swipe an identification card having a bar code or a magnetic stripe encoded with information identifying the particular user. The construction and operation of such magnetic or bar code card readers, keypads, and digital displays are well known to those skilled in the art and need not be repeated herein.

Below the lowermost user door 26h in the embodiment depicted in FIG. 1, the front panel 24 forming part of the door assembly 21 extends less than the full width of the vending machine 16. The remaining portion of that width is normally closed by an auxiliary door 25 that allows access to a storage compartment within the vending machine without opening the door assembly 21 and gaining access to the scrubs stored within the vending machine. A caster wheel 34 (FIG. 2) extends down from the lower edge of the front panel 24 and helps support the weight of the door assembly 21 when open.

Figure 2:
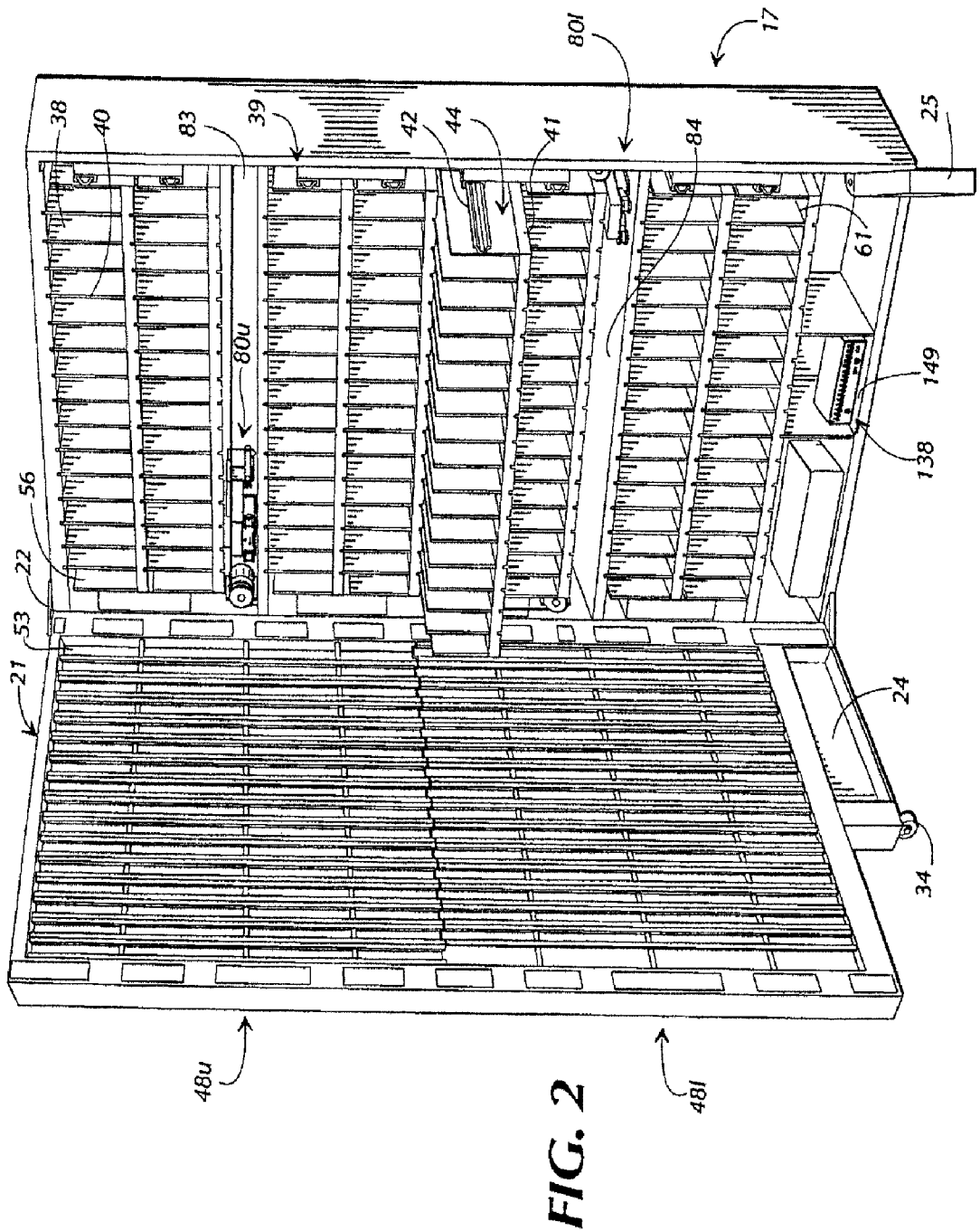
FIG. 2 is a pictorial view of the machine shown in FIG. 1, with the door assembly containing the user doors and the slot doors opened to expose the individual article-receiving slots.

Turning now to an embodiment shown in FIG. 2, the inside of the housing 17 is seen to contain a matrix of receptacles containing a plurality of individual receptacles or slots 38 for receiving scrubs or other articles to be vended from the vending machine 16. Individual slots 38 are located side-by-side across the width of the housing 17 to form horizontal levels or arrays 39 of the slots, also referred to as first arrays. It should be noted that the first arrays do not necessary need to form horizontal levels. In various other embodiments of the invention, the first arrays may form various other levels such as vertical or diagonal. Each slot 38 in an array 39 is separated from an adjacent slot by the upright dividers 40 attached at their lower edges to a base 41 associated with that array. The base 41 for each array 39 of slots preferably is mounted to the housing 17 of the vending machine by sliding track assemblies as seen at 42, allowing each individual array to slide outwardly from the housing as shown by the array 44, to facilitate stocking the slots with articles.

According to the embodiment shown in FIG. 2, the vending machine 16 contains eight separate vertically-separated first arrays or arrays 39 of slots 38 for receiving articles, and each first array contains sixteen slots. However, the number of slots in each first array, as well as the direction of the first arrays and the number of arrays in the vending machine, are design considerations and not critical features of the present invention. Referring back to the exterior of the embodiment of the vending machine as shown in FIG. 1, each user door 26a . . . 26h is aligned with a corresponding first array 39, so that opening a particular user door permits access only to the array 39 of slots located behind that particular user door. The slots of each first array 39 are positioned in vertical alignment with corresponding slots on the other first arrays, so that any particular slot is in a second array or vertical column of slots one slot wide and extending across plural first arrays within the housing 17. It should be noted that the second arrays, similar to the first arrays, may have various orientations in various embodiments of the invention such as horizontal or diagonal.

Figure 3:
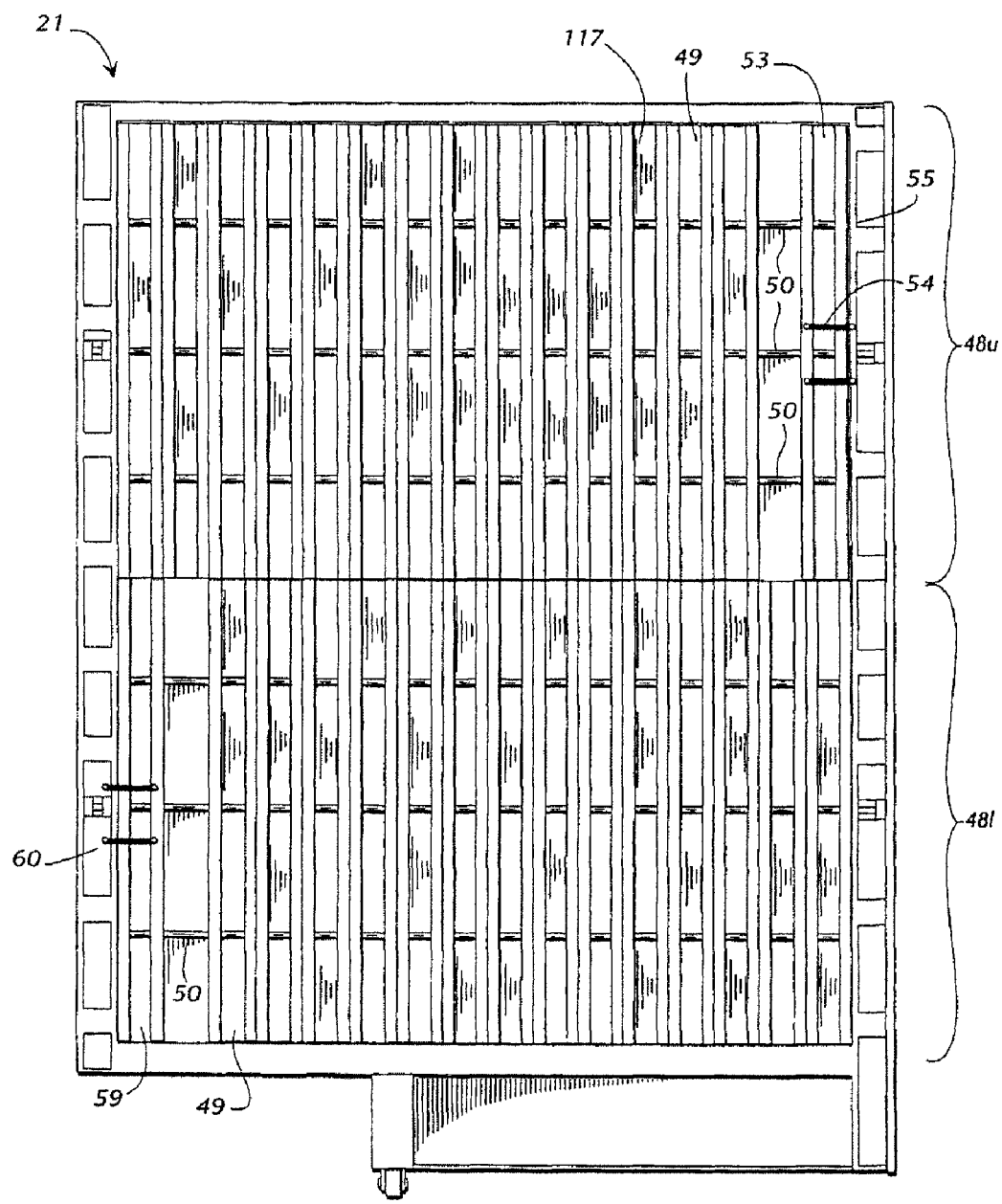
FIG. 3 is a rear elevation view of the door assembly shown in FIG. 2, illustrating the slot doors and the home positions of the slot doors.

The slots 38 making up each second array or column are selectively covered by a slot door arrangement located in the door assembly 21 and interposed between the slots 38 and the user doors 26a . . . 26h accessible from the front of the door assembly. Two slot door assemblies, an upper slot door assembly 48U and a lower slot door assembly 48L, are provided in various embodiments as best seen in FIGS. 2 and 3. The upper slot door assembly 48U selectively opens one second array in the upper four levels of slot arrays 39, and the lower slot door assembly 48L selectively opens one second array in the four lower levels of slot arrays. It should be understood that the second arrays selectively closed or opened by either the upper or lower slot door assemblies 48U or 48L consist of four vertically-stacked slots, in the configuration of this disclosed embodiment. However, various embodiments may employ various configurations. Thus, when an authorized person opens a particular user door such as the uppermost user door 26a, the upper slot door assembly 48U blocks access to all but one of the slots 38 in the uppermost first array 39 located behind that user door and behind the upper slot door assembly. This combination of selectively-openable user doors and selectively-positionable slot doors permits controlled access by authorized users to the contents of any individual slot 38 in the vending machine, while preventing access to all other slots during a vending operation.

FIG. 3 best shows details of the door assemblies 48U and 48L according to various embodiments of the invention. Each slot door assembly has a plurality of slot doors 49 mounted on horizontal rails 50 extending across the width of each slot door assembly. The individual slot doors 49 extend vertically in the slot door assemblies 48U; the width of each individual slot door is equal to the width of a slot 38, and the length of each individual slot door is the same as the vertical extent of the second array composed of the upper four first arrays 39. Those upper four first arrays of slots are closed by the upper slot door assembly 48U when the door assembly 21 is closed as shown in FIG. 1. The lower slot door assembly 48L likewise is composed of individual slot doors 49 slidably mounted on rails 50, those slot doors covering the lower four first arrays 39 of slots in the vending machine.

The upper and lower slot door assemblies 48U and 48L in this disclosed embodiment each have one less slot door 49 than the number of slots 38 located behind the slot door assembly. In the present embodiment, each first array 39 contains sixteen slots and the slot door assemblies thus each have fifteen slot doors 49. This allows lateral displacement of the slot doors 49 in each assembly 48U and 48L, so that any selected second array is unblocked by appropriate positioning of the slot doors on the mounting rails 50.

In various embodiments, the first slot door 53 of the upper slot door assembly 48U is spring-loaded by the springs 54 to engage the adjacent side frame 55 of the door assembly 21. This first slot door 53 thus always covers the left-most column 56 of slots in the upper four levels of first arrays 39, as seen when the door assembly 21 is closed (FIG. 3 shows the back side of the opened door assembly). The right-most slot door 59 of the lower assembly 48U (at the left, in FIG. 3) likewise is biased by the springs 60 to a position that closes the right-most column 61 of four slots in the four lower levels of first arrays 39. These spring-biased positions of the first slot doors 53 and 59 constitute home positions of those doors. The significance of those home positions is explained below.

Figure 4:
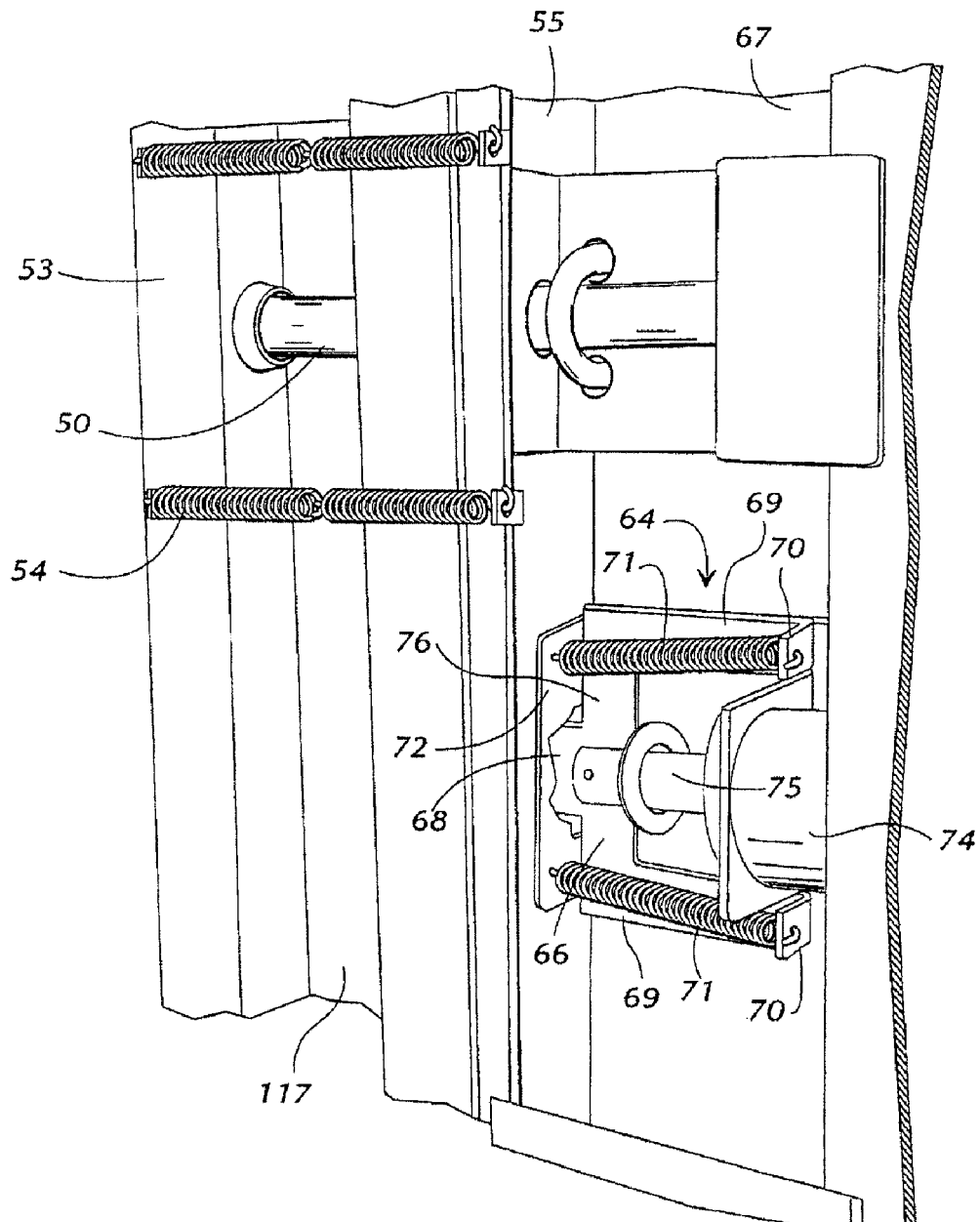
FIG. 4 is a fragmentary pictorial view showing the locking mechanism associated with the user door shown in FIG. 1 according to an embodiment of the present invention.

In various embodiments, the vertical slot doors 49 making up the upper and lower slot door assemblies are mounted in the door assembly 21 behind the horizontal user doors 26a . . . 26h, accessible from the front of the door assembly. As previously mentioned, those user doors are normally locked to prevent unauthorized access. The door assembly 21 also includes the separate lock mechanisms for each user door 26a . . . 26h in various embodiments. These lock mechanisms are located along the right side (as seen in FIG. 2) of the door assembly 21, and one such lock assembly 64 is detailed in FIG. 4. The lock assembly 64 is located in the door assembly to the right of the side frame 55 against which the first slot door 53 is biased to its home position. In this embodiment, the lock assembly 64 includes an actuator plate 66 mounted for sliding movement behind the vertical side panel 67 extending along one end of the user doors 26a . . . 26h (not visible in FIG. 4). The actuator plate 66 has somewhat the shape of a Y laid on its side, with a central part of the actuator plate forming a tang 68 extending outwardly from one end opposite the two parallel spaced-apart arms 69. The outer end 70 of each arm 69 is bent outwardly from the plane of the actuator plate, and those outer ends engage one end of corresponding tension springs 71. The other ends of the spring 71 are fastened to a stationary mounting plate 72 secured to the side frame 55 of the door assembly. The springs 71 thus bias the actuator plate 66 leftwardly, as seen in FIG. 4, moving the tang 68 of the actuator plate to engage a mating slot (not shown) in one of the user doors 26a . . . 26h, thereby locking that user door in the closed position shown in FIG. 1.

The lock assembly 64 includes an electrical solenoid 74 having an armature 75 connected to the central portion 76 of the actuator plate 66. When the solenoid 74 is actuated, the armature 75 withdraws the actuator plate 76 against the force of the springs 71, thereby withdrawing the tang 68 from its mating slot in the particular user door. That user door thus is unlocked and may be swung open, allowing the user to remove a scrub or other article from the particular slot 36 uncovered by the slot door assembly 48U or 48L located behind that particular user door.

FIGS. 4A, 4B, and 4C show details of a typical user door 26a according to various embodiments of the invention. The door is pivotably attached to the door assembly 21 by the pivot rods 194 and 195 extending outwardly from the ends of the user door for engaging openings in the adjacent structure of the door assembly. A compression spring 196 at the inner end of the pivot rod 195 urges that pivot rod outwardly to engage the door assembly, and permits pressing the pivot rod inwardly for installing and removing the user door. The pivot rod 194 is fixed with the user door 26a and rotates as that user door is opened or closed. A finger 206 is attached to the pivot rod 194 and extends radially outwardly therefrom, as best seen in FIGS. 4B and 4C. That finger 206 is positioned to selectively engage the user-door closure switch 133 when the user door 26a is closed (FIG. 4B) and to disengage that switch when the user door is opened (FIG. 4C).

A lock rod 199 extends substantially the length of the user door 26a. The lock rod 199 is supported with one end 200 positioned for engagement by the tang 68 of the actuator plate 66 for the lock assembly, and a spring 201 at that end urges the lock rod toward the tang. The other end 202 of the lock rod extends beyond the opposite end of the user door 26a and selectively engages the user-door frame comprised by the door assembly 21. The user door lock switch 134 is positioned within the door assembly 21 for engagement by the other end 202 of the lock rod 199, when the lock rod is pushed to the right (as viewed in FIG. 4A) by the locking mechanism 64 in opposition to the force of the spring 201.

A pair of tension cables 209 attaches between each user door and the door assembly 21 of the vending machine. Those tension cables are located near the upper longitudinal side 210 of the user door and extend longitudinally within the user door. A tension spring 213 attaches to an inner end of each tension cable, with the free end of each tension spring anchored to the user door at 214. The tension cables 209 extend from the free ends of the springs 213 to the respective cable guide bushings 215 at opposite ends of the user door near the upper side 210 thereof. The tension cables 209 pass through those guide bushings 215, and from there extend outwardly of the user door and upwardly to an outer end 218 secured to the door assembly 21 of the vending machine.

As seen in FIG. 4A, a cable stop collar 219 is affixed to each tension cable 209 a short distance beyond the free end of each tension spring 213. The locations of these stop collars on the tension cables are chosen so that the stop collars engage the cable guide bushings 220, located a short distance inwardly from each end of the user doors, when a predetermined extent of the tension cables has passed through the guide bushings 215.

In various embodiments, the slot doors 49 of the upper and lower slot door assemblies 48U and 48L are respectively positioned by the upper slot access mechanism (SAM) 80U and the lower SAM 80L, best seen in FIGS. 2 and 5-8. The upper and lower SAMs 80U and 80L are supported for movement along the horizontal tracks 81 and 82, best seen in FIG. 5, extending across the width of the housing 17. The upper track 81 is located in the lateral space 83 separating the second and third levels of first arrays, counting from the top of the housing 17. The lower SAM 80L likewise is situated in the lateral space 84 separating the sixth and seventh levels of first arrays. The SAMs and their respective support tracks do not interfere with the pull-out extension of the first arrays, as illustrated by the array 44. A single drive cable 87 extends along the SAM tracks 81 and 82 and connects to each SAM. Pulleys 88 at each end of the tracks 81 and 82 support the drive cable 87 in a generally rectangular path, with vertical portions 87a, 87b of the drive cable at the left and right sides of the housing 17 extending between the upper and lower tracks 81 and 82. The cable 87 loops around a drive wheel 89 connected to a motor 90 mounted at one side of the housing 17.

Figure 5:
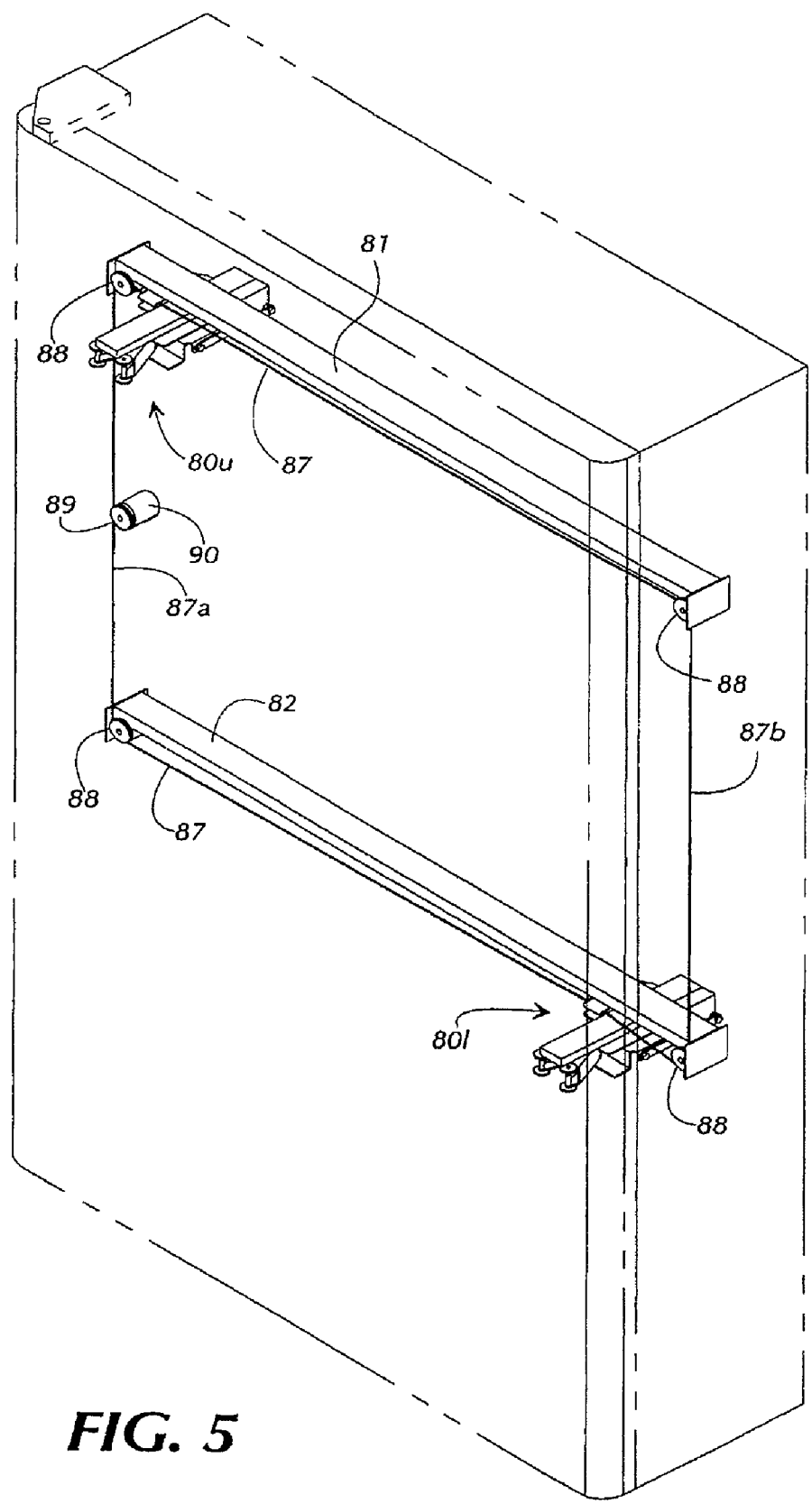
FIG. 5 is a pictorial view illustrating the drive mechanism for positioning the slot access mechanisms of an embodiment of the present invention.

In various embodiments, the upper SAM 80U and the lower SAM 80L are laterally offset from each other on their respective tracks 81 and 82, as seen in FIG. 5. In that position, each SAM is located adjacent the respective home position of the first slot doors 53 and 59, respectively, in the upper and lower slot door assemblies 48U and 48L as seen in FIG. 3. By driving the motor 90 to move the drive cable 87 in the clockwise direction as viewed in FIG. 5, that cable advances the upper SAM 80U along its track 81 toward the right side of the housing. At the same time, leftward movement of the cable 87 along the lower SAM track 82 moves the lower SAM 80L toward the left side of the housing. Counterclockwise movement of the drive cable 87 moves the SAMs in the opposite directions. It should now be understood that the SAMs are positionable adjacent any particular slot door 49 by operating the motor 90 until the appropriate SAM is moved into position adjacent and immediately behind that slot door.

To track movement of the SAMs on their tracks in various embodiments, one of those tracks 81 (FIG. 6) has a slot plate 94 containing location slots 95 corresponding in number to the article-receiving slots 38 in a first array 39. Each location slot 95 is located on the slot plate 94 corresponding to the stopping position of the SAMs at the slot door for that particular slot. These location slots 95 are sensed by an optical sensor 97 laterally movable with the upper SAM 80U as the drive cable 87 moves that SAM in either direction along the track 81. Because the two SAMs 80U and 80L are linked together by the drive cable and move in unison, only a single slot plate 94 and slot sensor 97 are required. The slot sensor 97 produces an electrical signal each time the SAM 80U passes a location slot 95 as the SAM moves away from its predetermined home location. By counting those slot-detection signals, the operating system associated with the vending machine 16 knows the location of the SAM relative to its home position and thus can stop the drive motor 90 when the SAMs arrive at a particular slot located a predetermined number of slots away from the home position.

Figure 6:
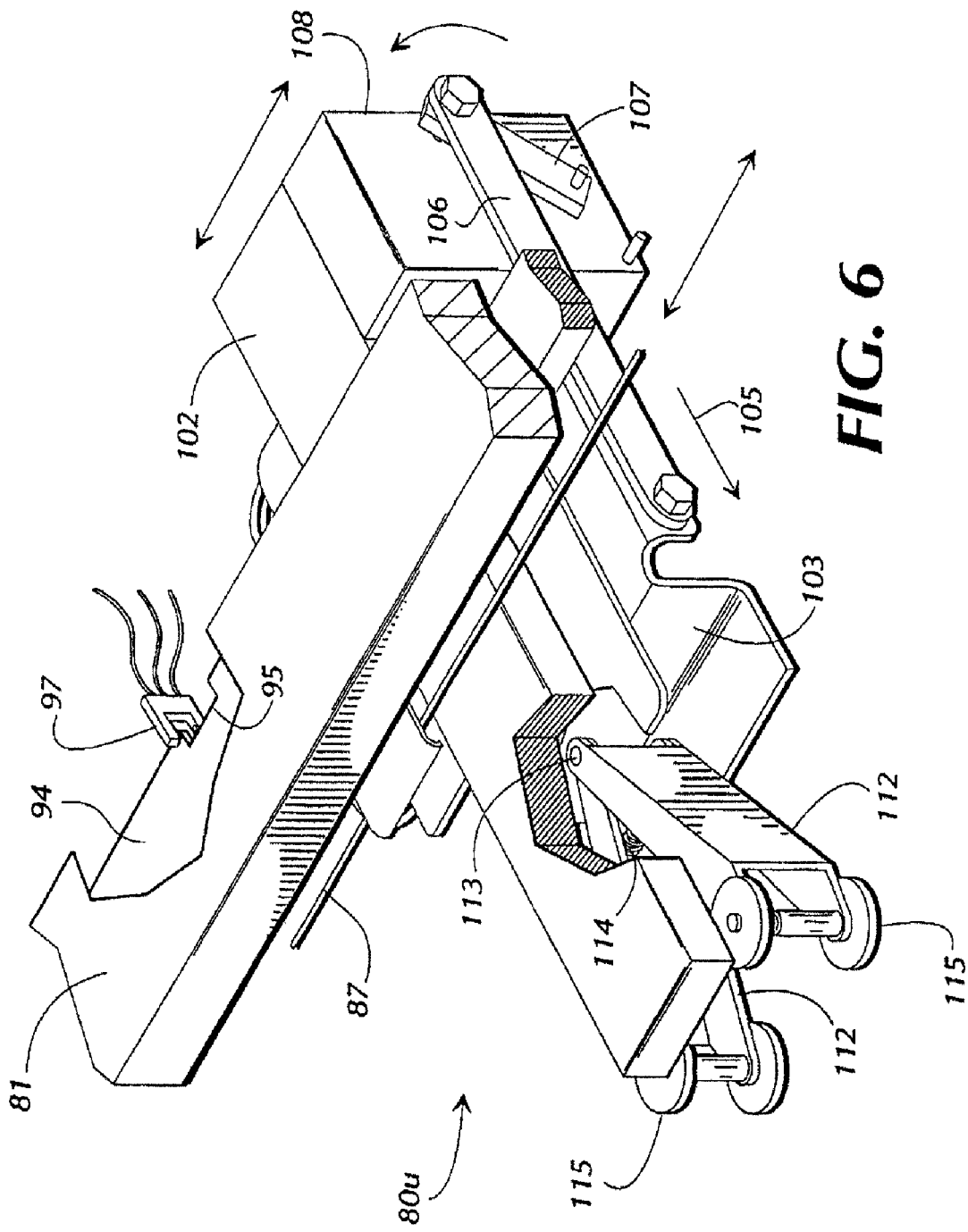
FIG. 6 is an enlarged fragmentary view, partially broken away for illustrative purposes, showing details of a slot access mechanism used in an embodiment of the present vending machine.
Figure 7:
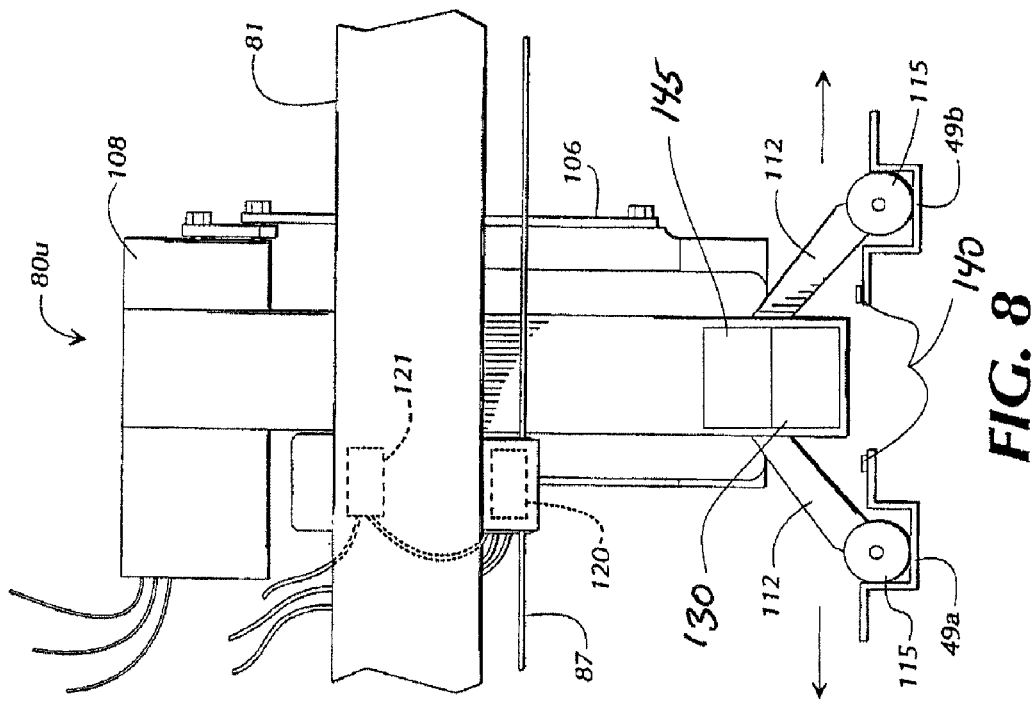
FIGS. 7 and 8 are fragmentary top plan views showing the slot access mechanism of an embodiment of the present invention in the retracted and extending positions, respectively.

Turning now to FIG. 6, the upper SAM 80U of various embodiments has a cross beam 102 suspended beneath the upper track 81 for movement along that track, as previously mentioned. That cross beam and the following description of the upper SAM 80U also applies to the lower SAM 80L unless the context indicates otherwise. The cross beam 102 is horizontal and extends perpendicular to the track 81, and supports an arm assembly 103 for a limited extent of movement in a direction parallel to the cross beam. This movement of the arm assembly 103 moves that arm assembly between the retracted position shown in FIGS. 6 and 7, and the extended position shown in FIG. 8. The motion arrow 105, FIGS. 6 and 7, represent movement of the arm assembly 103 from retracted to extended positions. A link 106 connects between the arm assembly 103 and a crank arm 107 of a powered actuator 108 carried by the cross beam 102, to extend and retract the arm assembly.

In various embodiments, the arm assembly 103 of each SAM, at the end facing the respective upper or lower slot door assemblies 48U and 48L, supports a pair of arms 112 pivotably attached at the vertical axis 113 to the arm assembly. A pair of rollers 115 is pivotably mounted at the end of each arm 112 remote from the pivot 113. The two arms 112 are mounted on the cross beam 102 so that, at rest, each arm defines an acute angle out from the longitudinal axis of the cross beam 102. The arms 112 are spring-biased together by the spring 114 to the rest position shown in FIG. 7.

Figure 8:
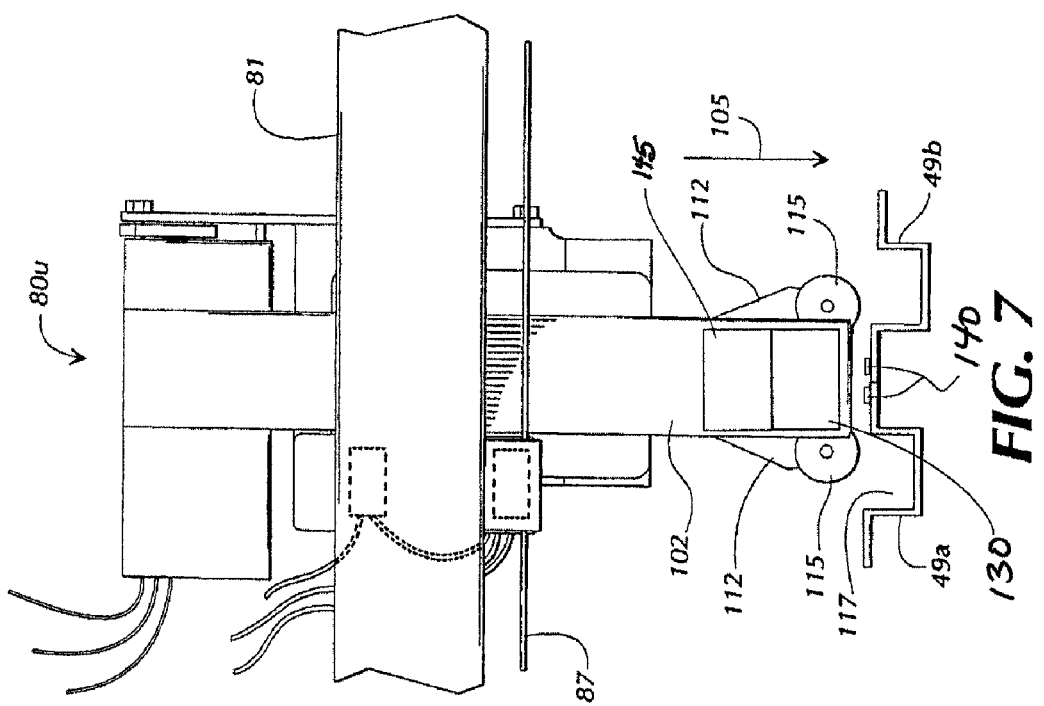

Reverting to the slot doors 49, in various embodiments, each slot door in transverse section (as shown in FIGS. 7 and 8) has a central portion depressed to form a channel 117. This channel extends the length of each slot door 49, as seen in FIG. 3. The length of each arm 112 on the SAMs, and the included angle between those two arms at rest, are chosen so that the rollers 115 at the ends of the arms are substantially aligned with the channels 117 of any two adjacent closed slot doors, such as the slot doors 49a and 49b (FIGS. 7 and 8) when the SAM is positioned in alignment with a particular second array normally closed by those slot doors. With the SAM thus positioned, operating the actuator 108 to extend the arm assembly 103 in the direction shown by the motion arrow 105 advances the arms 112 so that the rollers 115 enter the channels 117 of the two adjacent slot doors 49a and 49b. As the arm assembly 103 continues to advance, the rollers 115 exert a lateral component of force on those slot doors. That lateral force slides the slot doors 49a and 49b apart on the supporting rails 50 (FIG. 3) to the position as shown in FIG. 8, until those two slot doors are separated by a distance substantially the same as the width of an article-receiving slot 38. An advancement limit switch 120 (FIG. 8) carried by the SAM 80U operates to shut off the actuator 108 and produce a signal when the arm assembly 103 and the arms 112 are fully extended. Another limit switch 121 carried by the SAM 80U likewise operates to shut off the actuator 108 and produce a signal when the arm assembly 103 is returned to the fully-retracted position shown in FIGS. 6 and 7.

Figure 9:
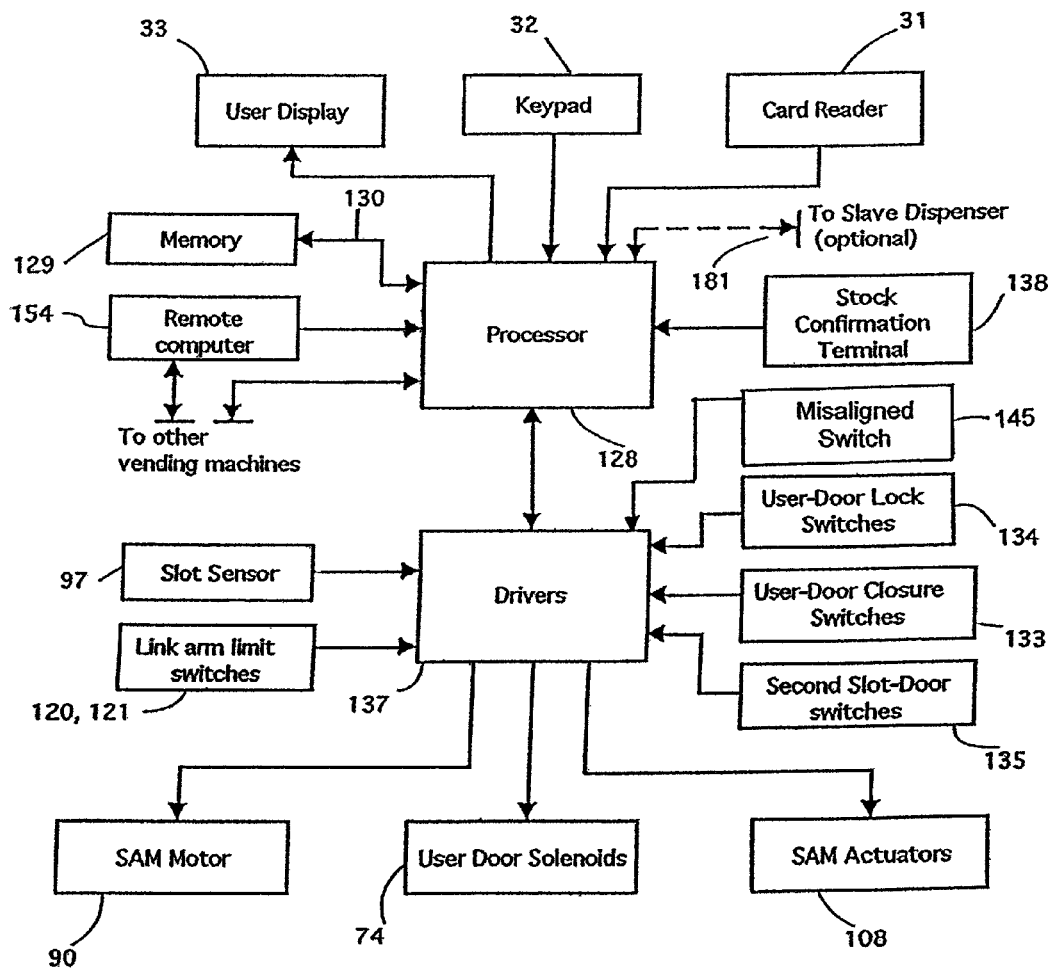
FIG. 9 is a block diagram of the operating control system in an embodiment of the present invention.

In various embodiments, a programmed microprocessor 128 (FIG. 9) and drivers 137 control the operation of the motive elements in the vending machine 16. This processor is connected to a memory 129 by a bus 130, and it will be understood that both the memory and the microprocessor in practice preferably are mounted on a single processor board located within the housing 17 of the vending machine. The processor is connected to receive input signals from the card reader 31 and the keypad 32 mounted on the door assembly 21, and to display appropriate programmed messages on the user display 33. The processor 128 supplies signals to device drivers collectively indicated at 137 in FIG. 9. These drivers, which are mounted on a common driver board in the preferred embodiment, are driven by appropriate signals from the processor 128. The nature and operation of device drivers, microprocessors, and related circuit elements are well known in the art, and those devices are not further described herein. The driver board includes a microprocessor in the preferred embodiment and also receives signals from the slot sensor 97, and counts the number of slots detected from the home position of the SAMs to determine the SAM position relative to that home position.

Also connected to provide inputs to the driver 137 in various embodiments are the user-door closure switches collectively indicated by the block 133, and the user-door lock switches collectively indicated at 134. A separate user-door closure switch 133 is mounted in the door assembly 21 to sense the closure of a particular user door and send the driver 137 a signal corresponding to that closure. A separate user-door lock switch 134 is associated with the lock assembly 64 for each user door 26*a* . . . 26*h*. Each lock switch 134 sends an appropriate signal to the driver 137 whenever that user door is actually locked by its corresponding lock assembly 64. The drivers thus are responsive to separate signals indicating the closure and lock status of each individual user door. The drivers 137 also receive signals from the link arm limit switches 120, 121 of each SAM, indicating the extended and retracted positions of the SAMs. Separate switches 135 associated with the upper and lower second slot doors adjacent to the first slot doors 53 and 59 signal the drivers when either of those second slot doors is displaced from their respective reset positions as described below. The SAM drive motor 90, the solenoids 74 with the lock assemblies 64 for the user doors, and the link arm actuators 108 each are powered by signals from device drivers collectively indicated at 137 in FIG. 9.

In various embodiments, the vending machine 17 is loaded by unlocking and opening the door assembly 21 to expose the slots 38 within the machine. Each slot preferably is visually marked, such as by color coding, to tell the person doing the loading which scrub size belongs in that slot. It is preferred to vend a set of scrubs, consisting of a top and a bottom, from some or all slots 38, so that a person using the vending machine can obtain a complete set of scrubs with a single vending operation. For example, the first sixteen slots, making up the entire uppermost array 39, could contain large tops and large bottoms, the first two slots on the next array might be large tops with medium bottoms, and so on.

Figure 10:
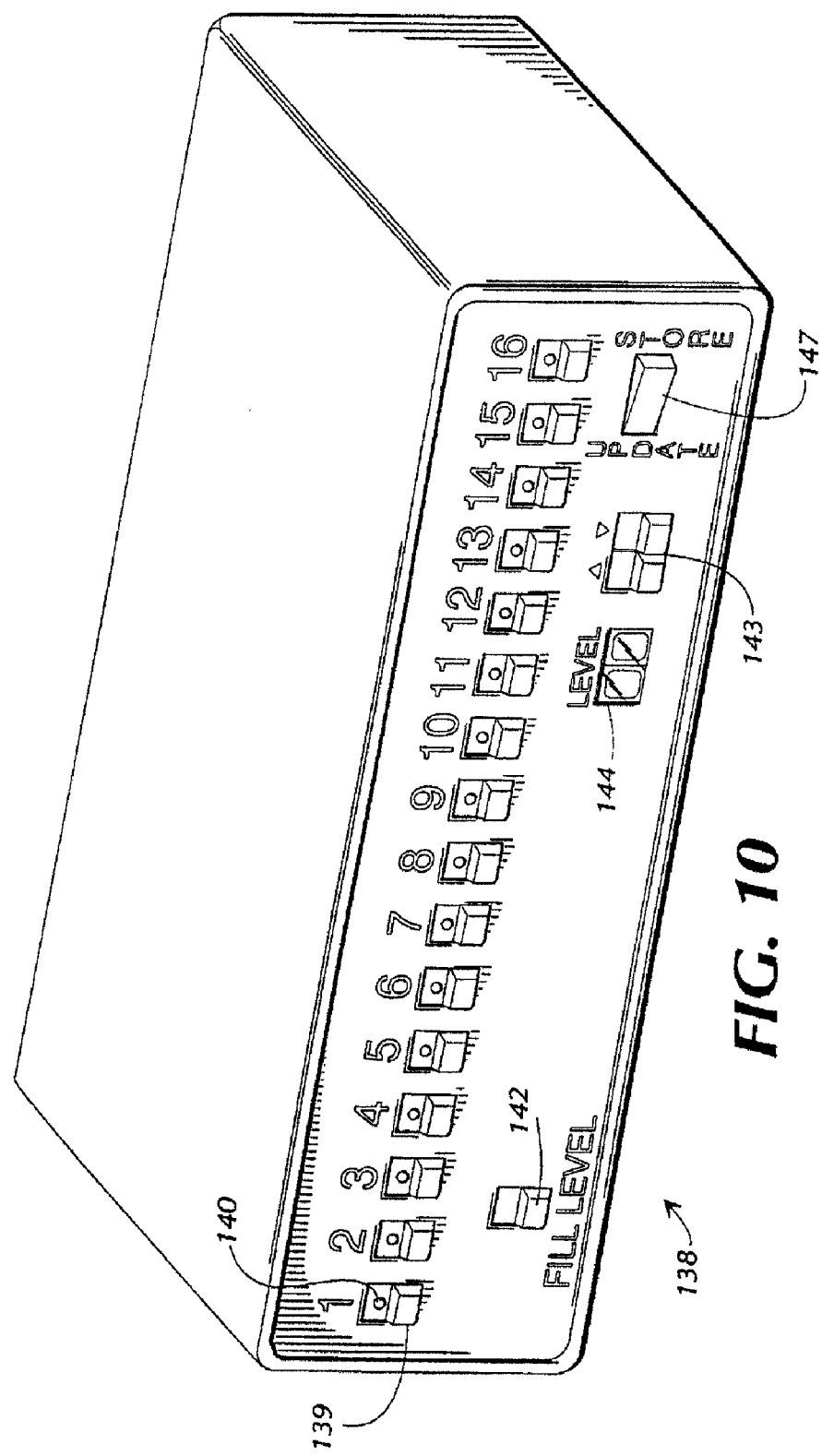
FIG. 10 is a pictorial view showing the stock confirmation terminal forming part of an embodiment of the present invention.

Scrubs of the appropriate sizes are loaded in the slots 38. Not all slots must contain scrubs; if clean scrubs are not available in the size combination assigned for each empty slot, those slots remain empty and in various embodiments that information is entered in the stock confirmation terminal 138, FIG. 10, which is connected to the processor 128 of the vending machine and stowed in a shelf below the bottom level of slots when not used.

In various embodiments, the front panel of the stock confirmation terminal 138 contains a horizontal array of pushbutton switches 139 corresponding in number and location to the slots 38 on each horizontal array 39 of the vending machine. Because each first array in the preferred embodiment contains sixteen slots, the switch array of the terminal 138 likewise contains sixteen switches 139. Those switches preferably are numbered on the terminal 138 in a manner corresponding with visible numbers on the slots 38 of the vending machine. An LED 140 is associated with each switch 139, and is controlled to toggle on or off as the corresponding switch likewise is toggled by the operator. The stock confirmation terminal also includes a fill level switch 142 operative to simultaneously toggle on or off all sixteen switches 139 and the corresponding LEDs 140. The fill level 142 thus is a convenience to a person stocking the vending machine, as will be described below.

In addition, in various embodiments, the stock confirmation terminal 138 also includes a pair of up-down switches 143, each being a momentary-contact push switch operative to select an upper or lower level of array 39 in the vending machine. The level indicator display 144 operates to provide the operator with a visual display indicating the selected level. The level information on the display 144 correlates with labels appearing on the individual arrays 39 within the housing 17, as well as with the level numbers 146 (FIG. 1) displayed on the outside of each user door 26*a* . . . 26*h*.

Once the operator has filled the slots 38 with scrubs available for the size combinations previously assigned for those slots, the operator uses the stock confirmation terminal 138 to program into the processor memory 129 the full/empty status of each slot. To accomplish this, the operator first switches the update-store switch 147 to the "Update" mode, which enables the terminal to communicate through the processor 128 to update the inventory database stored in the memory 129. The operator then uses the level switches 143 to select the first level, as indicated by the display 144, for data entry. If the operator selects the first or uppermost level, in the preferred embodiment, that corresponding number appears in the display 144. The operator next operates each switch 139 of the terminal to indicate the full (LED 140 illuminated) or empty (LED off) status of the corresponding slots at the selected level. If each slot at the selected level is either filled or empty, the operator can simply press the fill level switch 142 to toggle on or off all the switches 139 for that level. If all but a few slots 138 of the selected level are either filled or empty, the operator can use the fill level switch 142 to toggle all the switches 139 to that status, and can then operate individual switches 139 to indicate the opposite status of the few remaining slots at that level.

In various embodiments, the operator repeats the foregoing procedure for each level (corresponding to the first arrays 39) of the vending machine. The level switches 143 are operated to select the next desired level, shown by the display 144, for data entry, after which the individual slot switches 139 or the fill level switch 142 are manipulated to select the full/empty status of the individual slots at that next level. It will be understood that by operating a particular slot switch 139 in the "on" or "off" position, the processor 128 updates the database in memory to receive and store a signal corresponding to the filled/empty status of a corresponding particular slot 38. By manipulating the switches of the terminal 138 as described herein, the database is updated with information corresponding to the inventory of scrubs available for vending by the vending machine. After updating the status of each slot, the operator changes the update-store switch to "store" which disables all other controls on the stock confirmation terminal 138 and signals the processor that loading the vending machine is completed. In response to that signal, the processor 128 updates the database in memory and also sends the updated information to the central computer. This action ensures that the operator cannot inadvertently change the position of a slot switch while stowing the stock confirmation terminal in the shelf 149 (FIG. 2) at the bottom of the housing 17.

Figure 11A:
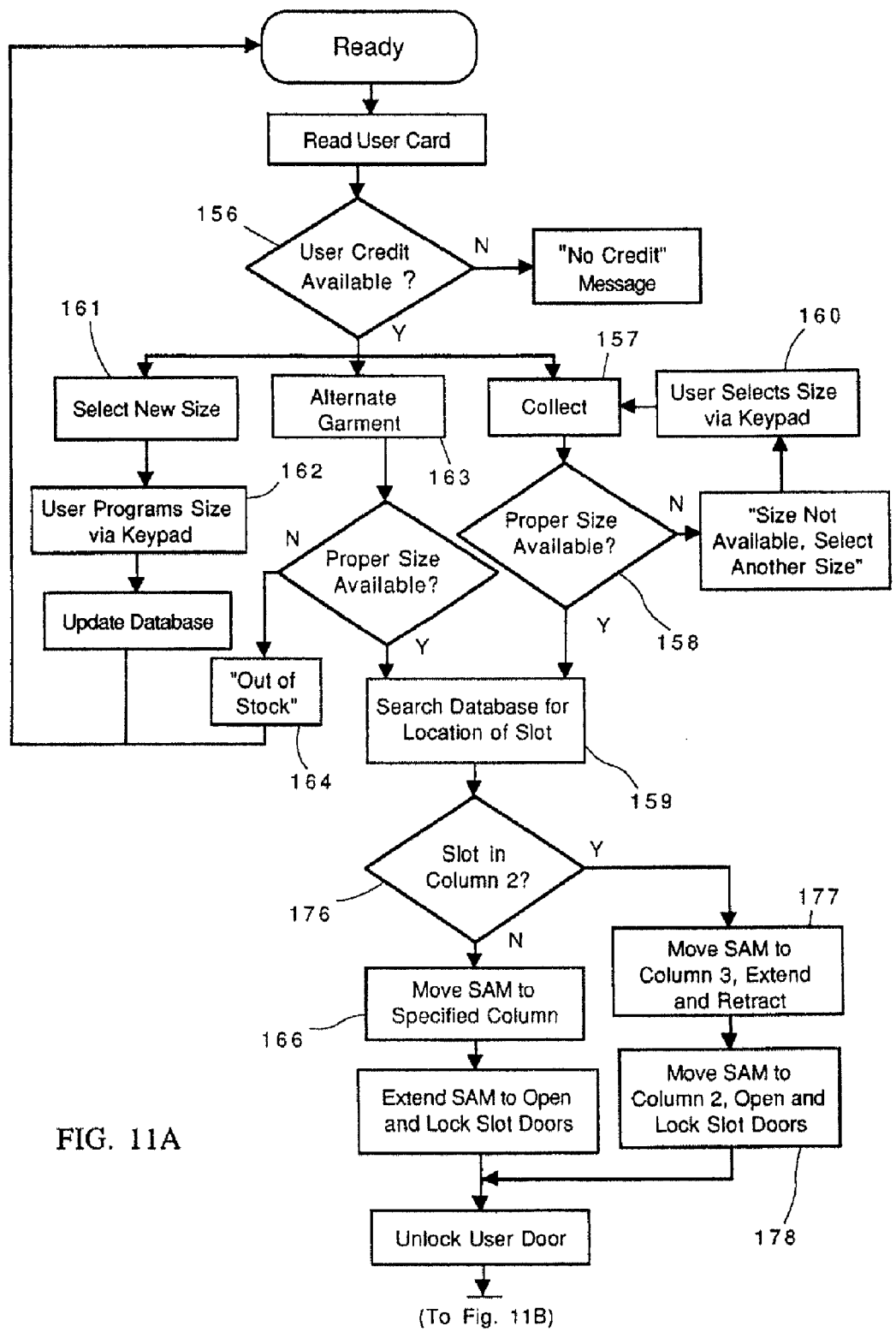
FIGS. 11A and 11B show a flow chart depicting the operation of an embodiment of the present invention.
Figure 11B:
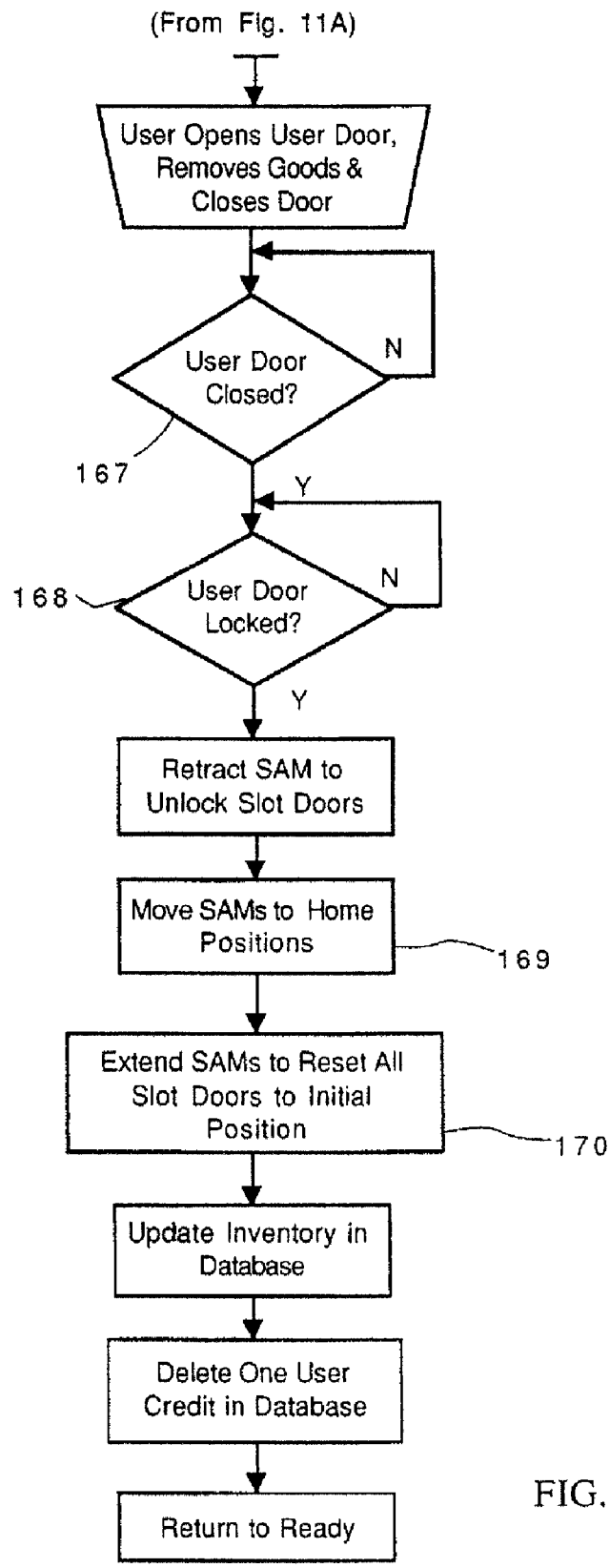

The operation of an exemplary embodiment is now described, with particular reference to the steps shown in FIGS. 11A and 11B. The following discussion assumes that a supply of scrubs is loaded into the vending machine and that each person authorized to withdraw scrubs from that machine is equipped with a user I.D. card encoded with a number unique to that person. The database in the memory 129 of the vending machine contains information including the name of that individual user and the preferred combination of scrub sizes for that user. Moreover, the database of the vending machine contains information about the user credits available to each authorized user. In various embodiments, the user-credit information is supplied by a remote computer 154 (FIG. 9) connected to the processor 128 for updating and monitoring the vending-machine database relating to usage of the vending machine. In the preferred embodiment, the processor 128 of the particular vending machine, along with the processors of similar machines located in an institution such as a hospital or the like, are connected through a suitable network to the remote computer 154 at a central location in the institution, and to the processors of each other scrub vending machine. A central remote computer connected to all scrub vending machines allows updating the user databases of each machine with added or deleted users or new size preferences, and collecting usage and inventory information in real time. The direct processor-to-processor connection permits each vending machine to receive updated information made available to any machine on the network, e.g., user-entered information changing that person's size preferences as discussed below, while the remote computer 154 is offline.

In various embodiments, the user credit information stored in the memory 129 is updated from time to time as each user returns soiled scrubs to a collection station. In one embodiment, this updating of the credit information may be accomplished manually, that is, through entries to the processor 128 or the remote computer 154 from time to time. Alternatively, in another embodiment, the processor 128 or the remote computer may receive information updating user credits from a scrub-receiving machine not a part of the present invention.

In various embodiments, an authorized user initiates a typical vending operation by swiping his or her I.D. card through the card reader 31 on the vending machine. The card reader senses the information encoded on that I.D. card, and the processor 128 checks the database in memory 129 to determine whether a scrub credit is available for that particular user, as indicated at step 156 in FIG. 11A. If the memory 129 indicates that no credit remains for this user, the processor 128 causes a "No credit" message to appear on the display 33. However, if credit is available, an appropriate message appears on the display and the user is instructed to press a particular button on the keypad 32 to collect a scrub as indicated by step 157.

In response to the collection signal, the processor 128 of various embodiments searches the database in memory to determine whether a scrub of the proper size is currently stocked in the vending machine. That search is indicated at step 158. If the scrub is stocked, the processor then searches its database for the location of a slot 38 containing that scrub as shown at step 159. However, if step 158 determines that a scrub of the proper size was not available the display 33 so informs and invites the user to select another size via the keypad 32. Step 160 shows this alternative selection. The processor 128 then repeats its search of the inventory database to see whether the newly-selected size is in stock.

If the user initially desires an alternate garment or additional garment, such as a scrub jacket instead of, or in addition to, the usual two-piece scrub garment, in various embodiments the user can enter an alternate-garment selection on the keypad 32 as shown at the step 163, instead of, or in addition to, the collection step 157. The processor 128 searches the database in memory to see whether that alternate selection is stocked. If not, an "Out of stock" message appears on the display 33 as indicated at step 164, and the user can make another selection. If the alternate garment is available, the processor searches the database as at 159 for the location of a slot containing that alternate garment.

If the user desires to change the scrub size information already in the database, in various embodiments the user presses a designated button on the keypad as at step 161. The user then enters the new size preferences in the keypad, as at step 162. In various embodiments, the processor 128 can forward the information to the remote computer 154 and/or to other networked vending machines, which can then update the user databases in all other connected vending machines in addition to the database in memory 129 of the preset vending machine. The user thus will receive scrubs of the new size for that person's next request, whether at this particular machine or any of the other networked machines. Once the user enters the new size, the operating program returns to ready status and the user can select a scrub.

In various embodiments, once the processor determines the location of a particular slot containing the requested scrub, the processor sends the drivers 137 a signal to operate the drive motor 90, moving the SAMs to the second array containing that particular slot. Typically in various embodiments, the SAMs initially occupy a home location shown in FIG. 5, with the upper SAM 80U positioned at the first or left-most slot of the upper slot assembly and the lower SAM 80L positioned at the first or rightmost slot of the lower slot assembly. The driver 137 thus commences operating the SAM drive motor 90 to move the upper SAM 80U rightwardly and the lower SAM 80L leftwardly via the drive cable 87.

As the SAMs move in their respective directions, the slot sensor 97 detects each location slot 95 and sends a slot detection signal to the appropriate driver of the drivers 137. The driver counts the number of location slots 95 detected by the slot sensor 97, and compares that count with the known location, stored in memory, of the particular slot being accessed. When the count comparison indicates that the SAMs are positioned at the slot doors 49 for that particular slot, the driver stops the SAM drive motor 90. The SAMs at this time have been moved to upper and lower second arrays or columns, including moved to the specified second array containing the particular slot, step 166 in FIG. 11A.

With the SAMs thus positioned, the driver next operates the actuator 108 of a particular SAM 80U or 80L to extend the arms 112 toward the slot doors presently closing the particular slot. As the SAM extends those arms, the rollers 115 at the outer ends of the arms enter and engage the channels 117 of the slot doors 49a and 49b (FIGS. 7 and 8) presently closing the particular slot. Continued advancing movement of the arms 112 thus slides the slot doors 49a and 49b on the rails 50, spreading apart and locking open those slot doors at the second array containing the particular slot 38 stocking a scrub of the requested size.

The advance limit switch 120 associated with the particular SAM in various embodiments sends the drivers 137 a signal that the slot door at the proper second array or column is open. The processor then causes the drivers to actuate the user door solenoid 74 for the particular user door at the level containing the particular slot. The lock switch 134 for that user door signals the processor that the proper door is unlocked. The processor then tells the user which door to open, via the user display 33. The user may now open the correct user door 26a . . . 26h, remove the scrub from the particular slot exposed through the open slot door, and then close the user door. All other slots 38 on that level remain blocked by the slot door assembly 48U or 48L.

In various embodiments, the tension springs 213 retain the user doors in the closed position. These tension springs exert force on the tension cables 209, drawing those tension cables inwardly through the cable guide bushings 215 at the ends of the user door and thereby urging the user door to the closed position shown in FIG. 1 (except for the user door 26e). When the lock assembly 64 withdraws the actuator plate 66 from locking engagement with the user door, the spring 201 moves the lock rod 199 to the left as viewed in FIG. 4A, withdrawing the other end 202 of the lock rod from locking engagement with the door assembly 21 of the vending machine. The lock assembly 64 thus unlocks both ends of the user door, allowing the user to open a particular user door by pulling downwardly on the handle 28 attached to the front of the user door.

As the user door pivots downwardly around the axis formed by the pivot rods 194 and 195, the tension cables 209 move outwardly from the cable guide bushings 215, extending the tension springs 213 mounted within the user door. Those tension springs and the tension cables 209 thus prevent uncontrolled downward movement of the user door, and also provide a restoring force urging the user door to the closed position when the handle 28 is released. The stop collars 219 engage the guide bushings 220 to limit further downward movement of the user door, when that door is moved to the full-open position, shown in FIGS. 1 and 4C as being substantially horizontal in the disclosed embodiment.

When the lock rod 199 is released by the lock assembly 64 for leftward movement as mentioned above, the other end 202 of that locking rod disengages the user-door lock switch 134. As the user door is pivoted downwardly from its closed position, the finger 206 disengages the user-door closure switch 133, as seen in FIG. 4C.

The closure switch 133 for the particular user door signals the drivers that the door is closed. In response to that input, the drivers 137 then release the corresponding solenoid 74 and relock the user door. A signal from the door lock switch 134 associated with that door lock confirms that the user door did in fact become locked. At the same time, the closure switch 133 confirms that the user door is still closed. This is a safety feature to ensure that the SAMs do not move until the user door is both closed and locked. These events appear as steps 167 and 168 on FIG. 11B.

In various embodiments, the drivers now cause the SAM actuator 108 to retract the arms 112 to the position shown in FIG. 7, releasing the slot doors 49a and 49b. Those slot doors momentarily remain in their previously-opened position. When the retract limit switch 121 signals that the SAM actuator is retracted, the SAM drive motor 90 is operated in the reverse direction to return the SAMs to the home positions, step 169. Once the SAMs return home in various embodiments, both SAMs are operated to extend and open the spring-loaded first slot doors 53 and 59 and the adjacent second slot doors, as shown at step 170, and then to retract and wait for the next request. This step re-closes the previously-opened slot doors 49a and 49b, and puts all the slot doors into a known position for the next operation, i.e., accomplishes a "full-reset" of the slot doors. In these embodiments, the spring-loaded first slot doors 53 and 59 are spring-loaded as previously disclosed, to ensure that the SAMs always know where those doors are when resetting the locations of the other doors to known locations, i.e., to locations closing the slots 38 associated with those doors. If either of the second slot-door switches 135 indicates that the slot door becomes displaced from the second slot after the slot doors have been reset to the initial position, the SAMs are activated to again reset the slot doors. In other embodiments, the SAMs are not required to return to the home positions in order to accomplish a full-reset. For example, in one embodiment a separate actuator may be placed in the frame of the vending machine 16 to open the spring-loaded first slot doors 53 and 59 and the adjacent second slot doors in order to accomplish a full-reset. One skilled in the art can envision other various ways to perform a full-reset.

At this point in various embodiments, if the user has requested an additional scrub garment, such as the jacket, the processor 128 determines the location of a particular slot containing the requested scrub, sends the drivers 137 a signal to operate the drive motor 90 to move the SAMs 80U and 80L to the second array or column containing that particular slot in order to repeat the process previously discussed.

Because the slot doors are always open at the second slots in various embodiments after a full-reset, a different sequence is required to access a particular scrub from a slot in the second column of slots. Returning to FIG. 11A, if step 159 locates a particular slot in column 2 as indicated by a "Yes" answer at step 176, the drive motor 90 first moves the SAMs to column 3 as indicated at step 177, and then extends and retracts the arms 112 while at that column. This step opens the slot door assembly 48U or 48L at the third column, which pushes the second slot doors up against the spring-biased first slot doors 53 or 59. The SAMs then are moved to the second column as indicated by step 178, and the upper or lower SAM extends to open and lock the slot doors covering the second slot.

Though sending the SAMs 80U and 80L back to the home positions after a vending operation provides the advantage of putting the slot doors into a known location for the next operation, there is a disadvantage to following this practice, as described above. For example, a typical vending operation requires only about six seconds to completing the dispensing of the scrubs to a user. However, a user request for dispensing scrubs immediately followed by a subsequent user request for dispensing scrubs can be time consuming if the SAMs 80U and 80L are required to return to the home positions to reset the slot doors after the user request is complete and before engaging in the subsequent user request. This full-reset operation can add as much as twelve to fifteen seconds to the total dispensing operation. As a result, a waiting line may form when a number of users want to obtain articles from the dispenser at the same time, such as for example, a number of hospital employees trying to obtain their scrubs during a shift change at a hospital.

Figure 11C:
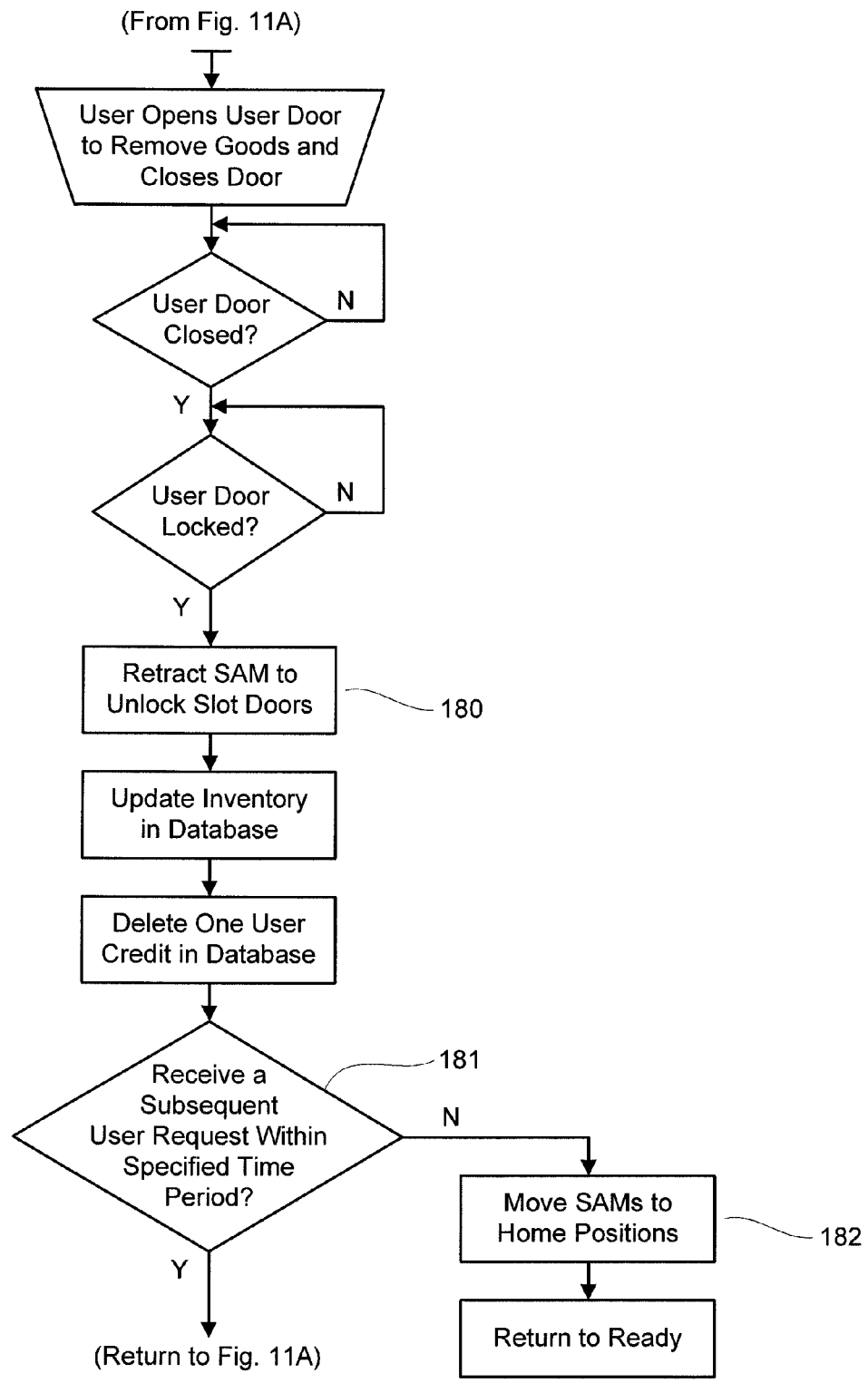
FIG. 11C shows a flow chart depicting the operation of an alternate embodiment of the present invention.

One solution to this disadvantage, as is practiced in alternative embodiments of the invention, is for the vending machine 16 to wait a specified time period in order to detect whether the machine 16 receives a subsequent user request to engage in another dispensing operation, as shown in step 181 of FIG. 11C. As will be apparent to one of ordinary skill in the art, this period of time can vary as desired. For example, the specified time period may be five seconds, ten seconds, thirty seconds, one minute, or any time until a subsequent user request is typically detected. Therefore, if the dispensing machine 16 does detect a subsequent user request to engage the vending machine 16 in a dispensing operation within the specified time period, the SAMs are moved directly to a location to allow the second dispensing operation. Thus, this eliminates the delay between the two user requests because the SAMs 80U and 80L are not required to return to the home positions in order to reset the slot doors in between the two dispensing operations.

Specifically, in various embodiments of the invention, once the drivers 137 cause the SAM actuator 108 to retract the arms 112 to release the slot doors 49a and 49b (FIG. 7) and step 180 (FIG. 11C) after completing the user request, the SAM drive motor 90 waits a specified time period in order to determine whether a user engages the vending machine 16 in a subsequent user request, as shown in step 181. It may be desirable to perform a full-reset such as the SAMs 80U and 80L returning to the home positions after the specified time period because the slot doors in the vending machine 16 can sometimes become misaligned. For example, in various embodiments the slot doors for a particular slot may become misaligned after a vending operation for that particular slot because when the arms 112 are retracted from the slot doors, the spring 114 in the arms partially pulls the doors shut. In addition, various slot doors may become misaligned because someone bangs or kicks the machine. Therefore, a full-reset helps to correct the misalignment. However, such practice is not required for all embodiments.

If the vending machine 16 does not detect a subsequent user request within the specified time period, the machine 16 performs a full-reset. In various embodiments this entails the processor 128 signaling the drivers 137 and the SAM drive motor 90 is operated in the reverse direction to return the SAMs to the home positions, as shown in step 182. However, if the vending machine 16 does detect a subsequent user request, e.g., a user engages the vending machine 16 by swiping his or her I.D. card within the specified time period, the processor 128 checks the database and determines whether the user has a scrub credit and whether the proper scrub size is available for the particular user. In other words, the steps shown in FIG. 11A are repeated for the subsequent user request. However, in this case the steps 176, 177, and 178 are not needed since the SAMs 80U and 80L are not starting from the home position and have not reset the slot doors to their initial position. Therefore, the different sequence shown in Steps 177 and 178 is not required in order to access a particular scrub from a slot in the second column of slots. Once the processor 128 determines the proper scrub size is available, the processor 128 determines the location of a particular slot containing the proper scrub size, as previously described, and sends the drivers 137 a signal to move the SAMs 80U and 80L to the second array or column containing that particular slot.

However, in this case, the SAMs 80U and 80L move directly from their previous location associated with the first user request to the second array containing the particular slot for the subsequent user request without first returning to the home location, or otherwise actions, to perform a full-reset. In one embodiment, the processor 128 determines the location of the closest available slot that contains the proper scrub size to the location of the slot selected in the first user request in order to minimize the time between the two dispensing operations. However, it should be apparent to one of ordinary skill in the art that the processor 128 may select any available location of a slot containing the proper scrub size.

In various embodiments, the vending machine 16 will direct the SAM 80U or 80L to skip at least one adjacent slot to the slot from the previous user request to ensure that the slot doors are not displaced for the available slot that contains the proper scrub size. This is because in various embodiments of the invention the adjacent slot doors are particularly susceptible to misalignment due to positioning of the slot doors from the previous user request. This is done so that when the SAM 80U or 80L is in the proper position and the actuator 108 of the SAM extends the arms 112 toward the slot doors, the slot doors will be properly aligned so that the doors may be opened. If the requested scrub size is only available behind an adjacent slot door, a full reset is done prior to moving to the adjacent slot door where the requested scrub size is available.

Figure 11D:
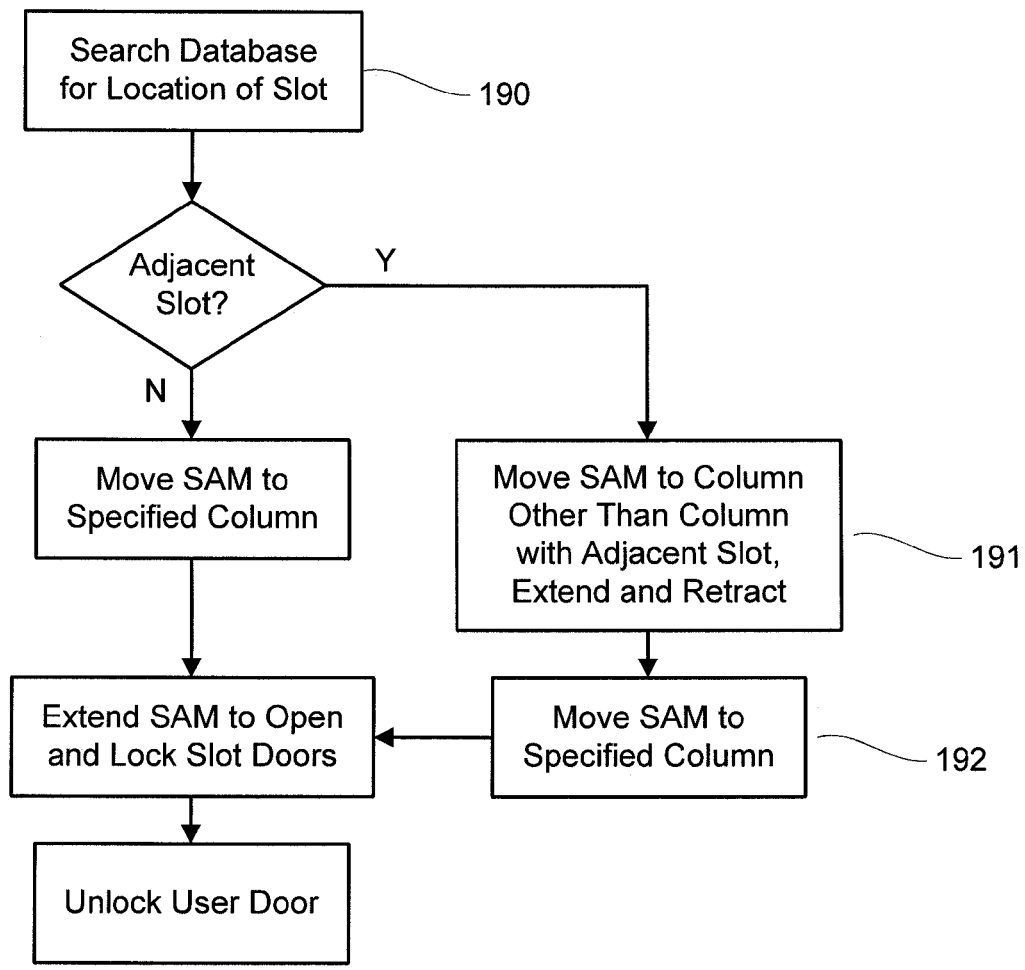
FIG. 11D shows a flow chart depicting the operation of an alternate embodiment of the present invention.

In alternative embodiments, if the requested scrub size is only available behind adjacent slot doors, e.g., slot doors that may be displaced or misaligned, then the SAM may perform a "mini-reset." In this case, the process 128 searches the database in order to location the slot where the requested scrub size is available, as shown in Step 190 (FIG. 11D). If the requested scrub size is only available in an adjacent slot, in Step 191 the SAM 80U or 80L moves to a position associated with a slot other than the adjacent slot so that the arm assembly 103 can selectively extend to engage the slot doors so as to reset the displaced adjacent slot doors in a fashion similar to a full reset as discussed above when the SAMs 80U and 80L return to the home positions. Once the displaced slot doors are reset, the SAM 80U or 80L is positioned to engage the slot doors for the adjacent slot so that the slot doors can be opened, as shown in Step 192. By following this practice, time is still saved because the SAMs 80U and 80L are not required to return completely to the home positions in order to reset the slot doors.

In one embodiment, the SAM 80U or 80L moves to a position to engage the slot doors corresponding to the closest slot to the adjacent slot for a mini-reset in order to minimize time between the dispensing operations. However, it should be understood that other doors can be selected.

Another practice found in various embodiments to address the potential problem of displaced slot doors is for the vending machine 16 to detect whether or not the slot doors for a chosen slot are properly aligned before or during the opening of the slot doors. In one embodiment, this may be accomplished by the slot-door switches of the selected slot doors indicating that either of the slot doors is displaced from the slot, similar to the second slot-door switches 135 indicating that either slot door has become displaced from the second slot after the slot doors have been reset to the initial position during a full-reset as discussed above.

Other various embodiments of the invention may include a detection mechanism 130 found in FIGS. 7 and 8 associated with the SAM 80U or 80L in order to detect the position of each slot door at a selected slot and whether the slot doors are aligned properly for operation. If the detection mechanism 130 detects that the slot doors are not properly aligned, the detection mechanism 130 signals the SAM drive motor 90 to either return the SAMs 80U and 80L to the home positions in order to reset the slot doors (full-reset) or move the SAMs 80U and 80L to a second slot position in order to reset the misaligned slot doors for the first slot in a fashion similar to resetting the slot doors of an adjacent slot, as discussed above (mini-reset).

Various mechanisms 130 can be used in order to detect whether the slot doors are displaced. For example, in one embodiment the detection mechanism 130 is composed of a magnetic sensor operative to measure the magnetic field of a metal ferro-magnetic tag 140 affixed to the slot doors. Therefore, when the SAMs 80U and 80L are positioned, the magnetic sensor 130 located on the SAM measures the magnetic field between the sensor 130 and the ferro-magnetic tag 140 on the slot door. If the field is below a certain threshold, the sensor 130 sets the misaligned switch 145, which in turn produces a signal to tell the SAM driver motor 90 to move the SAMs 80U and 80L to the home positions to carry out a full-reset or move to a second slot position to carry out a mini-reset.

In another embodiment, the detection mechanism 130 is an image capture device operative to obtain an image of the slot doors and to process the image in order to detect whether the slot doors are properly aligned. The image capture device 130 is affixed to the SAM 80U or 80L and obtains an image of the slot doors after the SAM is positioned for a particular slot. Once the image is obtained, the image capture device 130 then processes the image and either determines whether the doors are aligned or misaligned or sends the image to the processor 128, which determines whether the doors are aligned or misaligned. As in the case of the magnetic sensor, if the image capture device 130 or processor 128 determines that the slot doors are misaligned, the image capture device 130 or processor 128 sets the misaligned switch 145 and the SAMs 80U and 80L are returned to the home positions in order to carry out a full-reset or second slot position in order to carry out a mini-reset.

Figure 12:
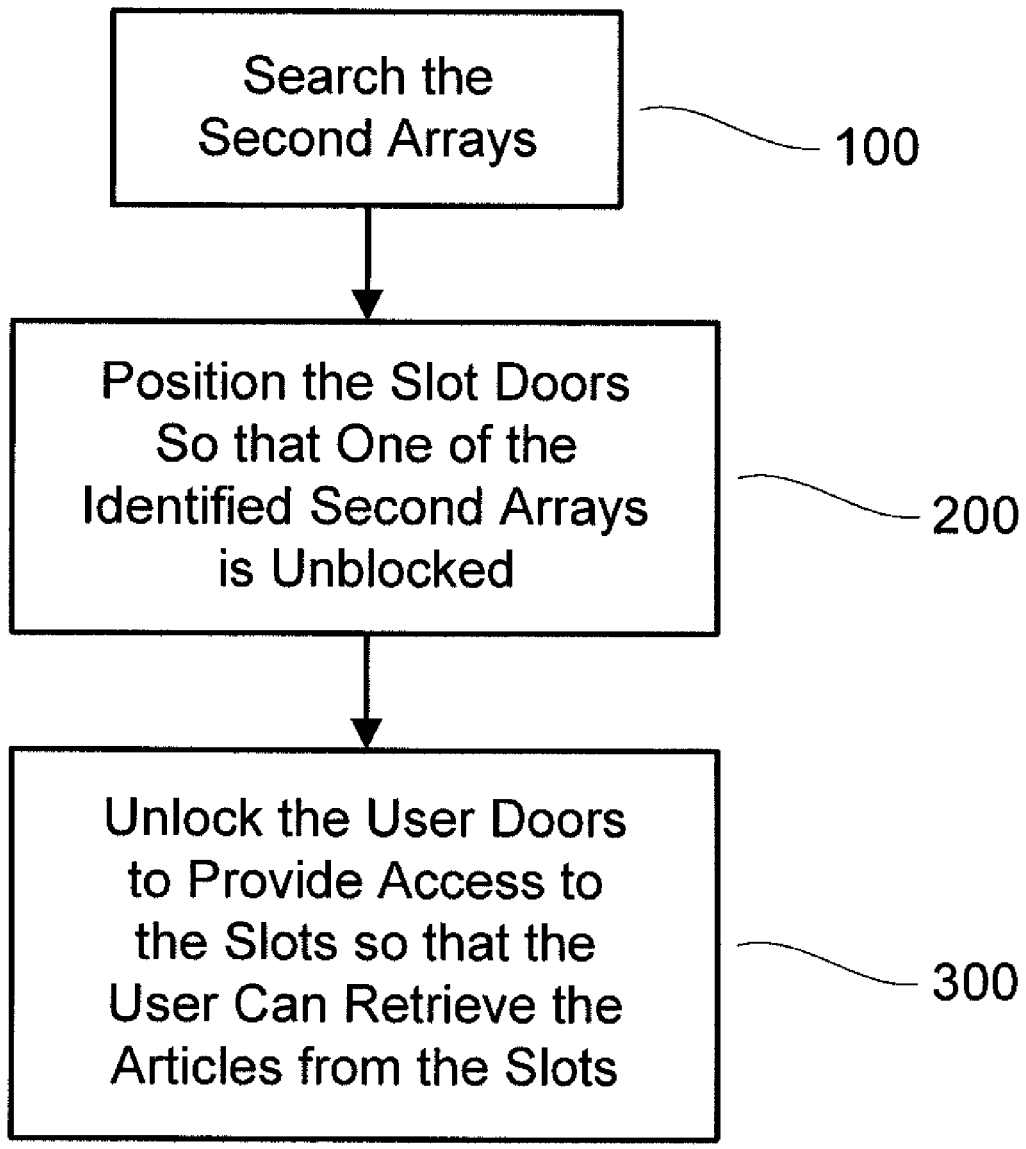
FIG. 12 shows a flow chart for dispensing multiple articles to a user according to an embodiment of the present invention.

Another practice that may be followed in various embodiments of the invention in order to reduce time between multiple dispensing operations is to search the various second arrays or columns to determine whether multiple articles to be dispensed are present in the slots of a particular second array. For example, a single user may want to retrieve a set of scrubs, e.g., a top, a bottom, and a jacket, from the vending machine 16. In this case, the top is located in one slot, the bottom in another slot, and the jacket in yet another slot. Therefore, in various embodiments, the processor 128 is operative to search each second array of the plurality of second arrays to determine whether one or more second arrays have a slot where the desired top, bottom, and jacket are available. Thus, as will be apparent to one of ordinary skill in the art, in many cases the user may desire to retrieve multiple articles from the vending machine 16 and the multiple articles may be located in several slots, all of which are not located in the same second array. Therefore, in various embodiments, the processor 128 searches all the second arrays to determine whether one or more of the second arrays have slots where any one or more of the desired articles the user wants to retrieve from the vending machine 16 are located, as shown in step 100 of FIG. 12.

Returning to our example, after determining that the top and bottom are located in separate slots in one second array and the jacket is located in a slot in a different second array, the RAM 80U or 80L is positioned so that the slot doors for the second array containing the slots where the top and pants are located are opened in order to unblock the slots for the entire second array. Thus, in various embodiments, the slot doors are positioned so that one of the second arrays identified by the processor 128 as having one or more slots where any one or more of the desired articles are available is unblocked by the slot doors, as shown in step 200. Finally, in step 300, the user doors are unlocked to provide access only to the slots where the one or more articles requested by the user are available to be dispensed so that the user can retrieve the articles. In the case of our example, if the top is located in the slot behind user door 2, shown as 26b (FIG. 1), then user door 2 is unlocked and the user opens user door 2 and retrieves the top. In addition, if the bottom is located in the slot behind user door 3, shown as 26c (FIG. 1), then user door 3 is unlocked and user opens user door 3 and retrieves the bottom, which is also in the same second array. In various embodiments, the user doors may be opened simultaneously or separately. Thus, by retrieving multiple articles from a single second array, valuable time is saved because the RAMs 80U and 80L are required to make minimal moves in order for the user to retrieve multiple articles from the vending machine 16.

As will be apparent to one of ordinary skill in the art, in various embodiments, if the multiple items are found across multiple second arrays, as is the case with the jacket in our example, the process will continue after dispensing the articles from the first determined second array to a next determined second array containing slots were one or more additional articles are located. Thus, in our example, the RAM 80U or 80L is position so that the slot doors for the second array containing the slot where the jacket is located are opened in order to unblock the slots for the entire second array. In turn, the user door is unlocked to providing access to the slot where the jacket is available so that the user can retrieve the jacket. This process continues sequentially until all of the articles have been dispensed to the user.

In addition, in various embodiments, the described practice above can also be enhanced by selectively stocking the articles in the vending machine 16. For example, if several hospital staff members each need a scrub top, bottom, and a jacket, the vending machine 16 can be stocked so that each staff member's scrubs are located in one second array. Therefore, each staff member can retrieve their scrubs from the vending machine 16 with minimal movement of the RAMs 80U and 80L and, in turn, minimal time to dispense the scrubs to several staff members.

Several procedures may be employed in order to determine groups of articles likely to be requested by a user in a single visit. For example, in one embodiment, the vending machine 16 may maintain a log of articles dispensed in single visits in order to determine the groups of articles. This may be accomplished by the processor 128 recording the articles requested by users during their visits in its database or this information may be stored on the remote computer 154. In another embodiment, the operator of the vending machine 16 may simply conduct surveys of users in order to determine the groups. For example, the hospital may have personnel standing at the vending machine 16 and recording what scrub articles and what sizes are requested by the hospital staff. This information can then be used in order to selectively stock the scrubs in the vending machine 16 so that most staff members' desired scrubs and size are located in one second array.

Lastly, it should be apparent to those of ordinary skill in the art that the various time improvements discussed above may be used in conjunction with one another in various embodiments of the invention. For example, if multiple articles to be dispensed to a user are spread across multiple second arrays, the processor 128 will determine whether the articles are located in one or more second arrays. If the articles are located in two second arrays, the RAM 80U or 80L is first positioned so that the slot doors are opened for the first determined second array and the user doors are unlocked in order for the user to retrieve the articles. Then, the RAM 80U or 80L is positioned, without returning to the home location, so that the slot doors are opened for the second determined second array and the user doors are unlocked in order for the user to retrieve the remainder of the articles.

In various embodiments, the vending machine 16 should be restocked with scrubs at a frequency depending on the capacity of the machine and the user demands at a particular location. To reduce the frequency and cost of restocking, in various embodiments the vending machine 16 may optionally be connected to a nearby separate vending machine that is mechanically like the present machine but is functionally slaved to the present machine. A slaved or satellite dispenser would lack a separate processor and memory, but would otherwise be like the vending machine as shown and described herein. In place of its own processor, the optional slaved machine would be connected by the line 181 (FIG. 9) to the processor 128 associated with the vending machine 16. That processor and its associated database in memory 129 would operate both vending machines, keeping up with the inventory remaining in each machine and directing users to open the appropriate user door of either machine after positioning the SAMs of that machine to access a particular slot containing the selected scrub.

It should now be apparent that vending machines as disclosed herein are not limited to dispensing scrubs, but can vend any discrete articles capable of being packaged or placed at slots or other receptacles within the machine. Because the articles being vended are never dropped and are not moved during the vending operation, until the user actually withdraws that article from the machine, the present machine is particularly well-adapted for vending articles, of which garments are but one example, that lack a fixed overall shape or are flexible and thus subject to damage if conveyed during a vending operation.

The slot doors 49 in an exemplary embodiment are divided into two separate assemblies 48U and 48L, as described, and a separate SAM moves the slot doors in each assembly. The disclosed embodiment uses this split arrangement because the length of slot doors that would extend over all eight levels of the slot arrays 39 might impair the movement of those slot doors. However, a vending machine having a single assembly of slot doors and a single SAM to move those slot doors is within the scope of the present invention.

In various embodiments, the remote computer 154 may be used to compile reports concerning scrub usage throughout a hospital or other institution or at a particular vending machine, or by individual users, or in any other way that multiple fields of data can be sorted and arranged. Because the remote computer is connected to each vending machine in an institution in various embodiments and receives frequent updates from the database in memory at each vending machine, data is available in near-real time to monitor usage and restocking needs for the vending machines.

Although the various embodiments operate with slot doors one less than the slots in an array, the apparatus can be made wider to accommodate an equal number of slot doors. The increased width would provide lateral space for displacing the slot doors by the SAMs, for parting the slot doors at any particular slot.

In place of individual displaceable slot doors as disclosed above, various embodiments may utilize a moveable panel having a single opening equal in width to a single slot. By positioning that panel within the vending machine, the opening becomes aligned with a particular slot.

It should also be apparent that the foregoing relates only to a preferred embodiment of the present invention, and that numerous changes and modifications therein may be made without departing from the spirit and scope of the invention as defined in the following claims.

What is claimed is:

1. Apparatus for dispensing articles, comprising:
a processor
an array of receptacles, wherein each receptacle is operative for receiving one or more articles to be dispensed;
a user door normally preventing access to a receptacle door assembly to a user;
the receptacle door assembly comprising a plurality of moveable receptacle doors operative to provide access to a select one of the receptacles when the user door is open;
a lock mechanism responsive to operation of the receptacle door assembly to enable access through the user door to the receptacle door assembly only after the receptacle doors are positioned to select a particular receptacle; and
a slot access mechanism comprising a drive mechanism, the slot access mechanism being associated with the receptacle door assembly and selectively operative in response to a user request to position the receptacle doors so that any selected receptacle in the array of receptacles remains unblocked by the receptacle doors, wherein the slot access mechanism is operative to position the receptacle doors so that a receptacle where one or more articles associated with the user request are available to dispense is unblocked by the receptacle doors and wherein the drive mechanism is operative to:
wait a specified time period after the user request is complete without returning the slot access mechanism to a home location in order for the processor to detect whether a subsequent user request occurs within the specified time period, wherein the home location is a location in which the slot access mechanism can perform a full-reset of the receptacle doors and the processor is operative to:

in response to detecting the subsequent user request within the specified time period, direct the drive mechanism to direct the slot access mechanism to position the receptacle doors so that the receptacle where one or more articles associated with the subsequent user request are available to dispense is unblocked by the receptacle doors; and
in response to not detecting the subsequent user request within the specified time period, return the slot access mechanism to the home location to perform a full-reset.

2. Apparatus as in claim 1, wherein the apparatus performs the full-reset by directing the slot access mechanism to return to the home location in order to reset the receptacle doors.

3. Apparatus as in claim 1, wherein the receptacle associated with the subsequent user request is the nearest receptacle where the one or more articles associated with the subsequent user request are available to dispense to the receptacle from the previous user request.

4. Apparatus as in claim 1, wherein in response to detecting the subsequent user request within the specified time period, the processor is operative to direct the drive mechanism to have the slot access mechanism skip at least one adjacent receptacle to the receptacle from the previous user request and position the receptacle doors so that a receptacle where the one or more articles associated with the subsequent user request are available to dispense is unblocked by the receptacle doors.

5. Apparatus as in claim 1, wherein:
the plurality of moveable receptacle doors are supported for displacement along a path parallel to the array and number one less than the number of receptacles in the array, wherein the receptacle doors are displaceable on the path to allow access to any selected receptacle while blocking access to the remaining receptacles;
the slot access mechanism further comprises:
a carriage selectively moveable adjacent the receptacle doors to a plurality of locations corresponding to the receptacles; and
an arm assembly moveable with the carriage in a retracted position retracted from the receptacle doors, wherein:
the receptacle door at a predetermined receptacle location corresponding to the home location is biased to a certain location so that the location of that receptacle door is known when the arm assembly is retracted; and
the arm assembly is operative to selectively extend at any such location to engage the receptacle doors blocking the receptacle and separate the engaged receptacle doors, thereby unblocking access to the corresponding receptacle in response to the user request.

6. Apparatus as in claim 5, wherein in response to detecting the subsequent user request within the specified time period:
the carriage is operative to skip at least one adjacent receptacle to the receptacle from the previous user request and move to a location corresponding to a receptacle where the one or more articles associated with the subsequent user request are available to dispense so that the arm assembly can selectively extend to engage the receptacle doors blocking the receptacle and separate the engaged receptacle doors, thereby unblocking access to the receptacle; and
if the one or more articles associated with the subsequent user request are only available in an adjacent receptacle to the receptacle from the previous user request, the carriage is operative to move to a receptacle other than the adjacent receptacle or the home location so that the arm assembly can selectively extend to engage the receptacle doors blocking the other receptacle so as to reset the receptacle doors corresponding to the adjacent receptacle where the one or more articles associated with the subsequent user request are available and then move to the location corresponding to the adjacent receptacle where the one or more articles associated with the subsequent user request are available to be dispensed so that the arm assembly can selectively extend to engage the receptacle doors blocking the receptacle and separate the engaged receptacle doors, thereby unblocking access to the receptacle.

7. Method for dispensing articles, said method comprising the steps of:
   (a) providing an array of receptacles, wherein each receptacle is operative for receiving one or more articles to be dispensed;
   (b) providing a user door normally preventing access to a receptacle door assembly to a user;
   (c) providing the receptacle door assembly comprising a plurality of moveable receptacle doors operative to provide access to a select one of the receptacles when the user door is open;
   (d) providing a processor to detect user requests;
   (e) positioning the plurality of moveable receptacle doors in response to a user request so that a receptacle in the array of receptacle where one or more articles associated with the user request are available to dispense remains unblocked by the receptacle doors;
   (f) unlocking the user door to provide access to the receptacle where the one or more articles associated with the user request are available to dispense; and
   (g) waiting a specified time period after the user request is complete without returning the plurality of moveable receptacle doors to a home configuration in order to detect whether a subsequent user request occurs within the specified time period, wherein:
      (1) in response to detecting the subsequent user request within the specified time period, positioning the plurality of moveable receptacle doors so that a receptacle where one or more articles associated with the subsequent user request are available to dispense is unblocked by the receptacle doors; and
      (2) in response to not detecting the subsequent user request within the specified time period, returning the plurality of moveable receptacle doors to a home configuration.

8. The method of claim 7, wherein the receptacle associated with the subsequent user request is the nearest receptacle where the one or more articles associated with the subsequent user request are available to dispense to the receptacle from the previous user request.

9. The method of claim 7, wherein in response to detecting the subsequent user request within the specified time period:
   (1) skipping at least one adjacent receptacle to the receptacle from the previous user request; and
   (2) positioning the plurality of moveable receptacle doors so that a receptacle where the one or more articles associated with the subsequent user request are available to dispense is unblocked by the receptacle doors.

10. Apparatus for dispending articles, comprising:
   an array of receptacles, each receptacle is operative for receiving one or more articles to be dispensed;
   a user door normally preventing access to a receptacle door assembly to a user;
   the receptacle door assembly comprising a plurality of moveable receptacle doors operative to provide access to a select one of the receptacles when the user door is open;
   a lock mechanism responsive to operation of the receptacle door assembly to enable access through the user door to the receptacle door assembly only after the receptacle doors are positioned to select a particular receptacle;
   a slot access mechanism associated with the receptacle door assembly and selectively operative to position the receptacle doors so that any selected receptacle in the array of receptacles remains unblocked by the receptacle doors; and
   a detection mechanism associated with the slot access mechanism and operative to detect a position of each receptacle door when at the selected receptacle and not at a home location and whether the receptacle doors at the selected receptacle are aligned properly for operation of the receptacle doors so that the selected receptacle in the array of receptacles is unblocked by the receptacle doors.

11. Apparatus as in claim 10, wherein in response to detecting the receptacle doors at the selected receptacle are not properly aligned, the detection mechanism is further operative to instruct the slot access mechanism to reset the receptacle doors.

12. Apparatus as in claim 10, wherein the receptacle doors further comprise a metal ferro-magnetic tag and the detection mechanism comprises a magnetic sensor operative to measure the position of the tag in order to detect whether the receptacle doors are properly aligned.

13. A method for dispensing articles, said method comprising the steps of:
   (a) providing an array of receptacles, each receptacle is operative for receiving one or more articles to be dispensed;
   (b) providing a user door normally preventing access to a receptacle door assembly to a user;
   (c) providing the receptacle door assembly comprising a plurality of movable receptacle doors operative to provide access to a select one of the receptacles when the user door is open;
   (d) detecting a position of each receptacle door when at the selected receptacle and not at a home location and whether the receptacle doors at the selected receptacle are aligned properly for operation of the receptacle doors so that the selected receptacle is unblocked by the receptacle doors;
   (e) in response to detecting the position of each receptacle door at the selected receptacle is aligned properly, positioning the receptacle doors so that the selected receptacle in the array of receptacles remains unblocked by the receptacle doors; and
   (f) unlocking the user door to provide access to the selected receptacle.

14. The method of claim 13 further comprising the step of:
   In response to detecting the position of at least one of the receptacle doors at the selected receptacle is not aligned properly, performing a full-reset.

15. The method of claim 13 further comprising the step of:
   In response to detecting the position of at least one of the receptacle doors at the selected receptacle is not aligned properly, positioning the receptacle doors at a second receptacle door in order to reset the receptacle doors at the selected receptacle.

16. A method for dispensing a plurality of articles requested by a user from a dispensing apparatus, said method comprising the steps of:
- (a) providing a matrix of receptacles for receiving one or more articles to be dispensed, wherein the matrix comprises:
  - a plurality of first arrays wherein each first array comprises a plurality of receptacles and the plurality of first arrays are mutually parallel to each other along a dimension perpendicular to each first array so that receptacles of each first array are juxtaposed with receptacles of an adjacent first array; and
  - a plurality of second arrays wherein each second array comprises a selected juxtaposed receptacle in each first array;
- (b) providing a plurality of user doors each operative to prevent access to a receptacle door assembly to a user;
- (c) providing the receptacle door assembly that comprises a plurality of moveable receptacle doors operative to provide access to a particular second array of the plurality of second arrays;
- (d) searching each second array of the plurality of second arrays to determine whether one or more second arrays have receptacles where at least two of the plurality of articles requested by the user are available to be dispensed;
- (e) positioning the receptacle doors of the receptacle door assembly so that one of the second arrays identified in Step (d) is unblocked by the receptacle doors; and
- (f) unlocking the user doors to provide access only to the receptacles associated with the second array unblocked in Step (e) and where the at least two articles requested by the user are available to be dispensed so that the at least two articles can be dispensed.

17. The method of claim 16 further comprising the steps of:
- (g) determining groups of one or more articles likely to be requested by a user in a single visit; and
- (h) loading the one or more articles of each group into a single second array for the group.

18. The method of claim 17, wherein Step (g) comprises the sub-step of maintaining a log of articles dispensed in single visits in order to determine the groups of one or more articles likely to be requested by a user in a single visit.

19. The method of claim 17, wherein Step (g) comprises the sub-step of conducting a survey of users in order to determine the groups of one or more articles likely to be requested by a user in a single visit.

20. The method of claim 16, further comprising the steps of:
- (g) positioning the receptacle doors of the receptacle door assembly so that a next second array identified in Step (d) is unblocked by the receptacle doors; and
- (h) unlocking the user doors to provide access only to the receptacles associated with the next second array and where the one or more articles of the plurality of articles requested by the user are available to be dispensed so that the one or more articles can be dispensed.

21. The method of claim 20, wherein the Steps (g) through (h) are repeated until all the articles of the plurality of articles requested by the user are dispensed.

* * * * *